United States Patent
Nasu

(10) Patent No.: US 12,242,845 B2
(45) Date of Patent: Mar. 4, 2025

(54) DEVELOPMENT SUPPORT DEVICE, NON-TRANSITORY COMPUTER-READABLE MEDIUM, AND DEVELOPMENT SUPPORT METHOD

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 116 days.

(21) Appl. No.: 17/918,913

(22) PCT Filed: Jun. 19, 2020

(86) PCT No.: PCT/JP2020/024064
§ 371 (c)(1),
(2) Date: Oct. 14, 2022

(87) PCT Pub. No.: WO2021/255910
PCT Pub. Date: Dec. 23, 2021

(65) Prior Publication Data
US 2023/0251857 A1    Aug. 10, 2023

(51) Int. Cl.
*G06F 8/73* (2018.01)
*G06F 8/20* (2018.01)
(Continued)

(52) U.S. Cl.
CPC .............. *G06F 8/73* (2013.01); *G06F 8/20* (2013.01); *G06F 8/77* (2013.01); *G06Q 10/10* (2013.01)

(58) Field of Classification Search
CPC .... G06F 8/73; G06F 8/20; G06F 8/77; G06Q 10/10
See application file for complete search history.

(56) References Cited

U.S. PATENT DOCUMENTS 9,558,098 B1 *   1/2017   Alshayeb ............ G06F 11/3604
10,885,112 B2 *  1/2021   VanderDrift .......... G06F 16/289
(Continued)

FOREIGN PATENT DOCUMENTS

JP    2008-186356 A    8/2008
JP    2010-257452 A   11/2010
(Continued)

OTHER PUBLICATIONS

International Search Report and Written Opinion mailed on Sep. 8, 2020, received for PCT Application PCT/JP2020/024064, filed on Jun. 19, 2020, 12 pages including English Translation.
(Continued)

*Primary Examiner* — Wei Y Zhen
*Assistant Examiner* — Brahim Bourzik
(74) *Attorney, Agent, or Firm* — XSENSUS LLP

(57) ABSTRACT

A development support device includes a document analyzing unit (130) that analyzes a described matter in development documents created in a development process and specifies functions described in the development documents; a component analyzing unit (140) that specifies a model corresponding to the specified functions and uses the analysis results of the described matter to generate multiple components conforming to a standardized format with respect to the specified model; and a model generating unit (150) that generates the specified model by incorporating components selected from the multiple components in accordance with the standardized format.

15 Claims, 17 Drawing Sheets

122

| No. | DOCUMENT NAME | PRECEDING DOCUMENT | FOLLOWING DOCUMENT | RELATIVE DOCUMENT |
|---|---|---|---|---|
| 1 | REQUIREMENTS DEFINITION DOCUMENT | – | 2 | 6 |
| 2 | BASIC DESIGN DOCUMENT | 1 | 3 | 5 |
| 3 | DETAILED DESIGN DOCUMENT | 2 | 4 | 4 |
| 4 | UNIT TEST SPECIFICATION | 3 | 5 | 3 |
| 5 | INTEGRATION TEST SPECIFICATION | 4 | 6 | 2 |
| 6 | SYSTEM TEST SPECIFICATION | 5 | – | 1 |

122a  122b  122c  122d  122e

(51) Int. Cl.
*G06F 8/77* (2018.01)
*G06Q 10/10* (2023.01)

(56) References Cited

U.S. PATENT DOCUMENTS

| | | | | |
|---|---|---|---|---|
| 2002/0026630 A1* | 2/2002 | Schmidt | ............... | G06F 8/20 |
| | | | | 717/103 |
| 2002/0046394 A1* | 4/2002 | Do | ............... | G06F 8/20 |
| | | | | 717/108 |
| 2005/0165829 A1* | 7/2005 | Varasano | ............... | G06Q 30/00 |
| | | | | 707/999.102 |
| 2006/0259499 A1* | 11/2006 | Moulckers | ............ | G06F 40/186 |
| | | | | 715/764 |
| 2008/0098349 A1* | 4/2008 | Lin | ............... | G06F 11/3664 |
| | | | | 717/106 |
| 2009/0018806 A1* | 1/2009 | Butterfield | ......... | G06Q 10/0631 |
| | | | | 703/6 |
| 2010/0275179 A1 | 10/2010 | Mengusoglu et al. | | |
| 2013/0097583 A1* | 4/2013 | Kung | ............... | G06F 8/10 |
| | | | | 717/105 |
| 2014/0075407 A1* | 3/2014 | Donis | ............... | G06F 8/71 |
| | | | | 717/102 |
| 2014/0337816 A1* | 11/2014 | Chiluvuri | ............... | G06F 8/20 |
| | | | | 717/107 |
| 2015/0199181 A1* | 7/2015 | Gimnich | ............... | G06F 8/20 |
| | | | | 717/104 |
| 2015/0378721 A1* | 12/2015 | Schaefer | ............... | G06F 8/73 |
| | | | | 717/104 |
| 2017/0003937 A1* | 1/2017 | Huebra | ............... | G06F 8/73 |
| 2017/0161024 A1 | 6/2017 | Senzaki et al. | | |

FOREIGN PATENT DOCUMENTS

| | | |
|---|---|---|
| JP | 2013-164670 A | 8/2013 |
| JP | 2016-218851 A | 12/2016 |
| JP | 2017-102745 A | 6/2017 |

OTHER PUBLICATIONS

Extended European search report issued on Jun. 30, 2023, in corresponding European patent Application No. 20941398.8, 14 pages.

Morayo Adedjouma et al. "Requirements Exchange: from Specification Documents to Models", 2011 16th IEEE International Conference on Engineering of Complex Computer Systems, 2011, pp. 350-354.

European Office Action issued Aug. 13, 2024 in corresponding European Patent Application No. 20941398.8, 8 pages.

* cited by examiner

| No. | DOCUMENT NAME | PRECEDING DOCUMENT | FOLLOWING DOCUMENT | RELATIVE DOCUMENT |
|---|---|---|---|---|
| 1 | REQUIREMENTS DEFINITION DOCUMENT | – | 2 | 6 |
| 2 | BASIC DESIGN DOCUMENT | 1 | 3 | 5 |
| 3 | DETAILED DESIGN DOCUMENT | 2 | 4 | 4 |
| 4 | UNIT TEST SPECIFICATION | 3 | 5 | 3 |
| 5 | INTEGRATION TEST SPECIFICATION | 4 | 6 | 2 |
| 6 | SYSTEM TEST SPECIFICATION | 5 | – | 1 |

FIG. 4

| No. | CHAPTER NUMBER | SECTION NUMBER | TITLE |
|---|---|---|---|
| 1 | 1 | | Overview |
| 2 | | 1.1 | Purpose and scope |
| 3 | | 1.2 | Who should read this document? |
| 4 | | 1.3 | Document tree |
| 5 | | 1.4 | Traceability description |
| 6 | | 1.5 | Requisite documents |
| 7 | 2 | | Term explanation |
| 8 | | 2.1 | Definitions |
| 9 | | 2.2 | Acronyms/Abbreviations |
| 10 | 3 | | System structure |
| 11 | | 3.1 | Overall system structure |
| 12 | | 3.2 | Names and basic functionalities of each system component |
| 13 | | 3.3 | Basic specifications of external elements related to the software |
| 14 | 4 | | Software structure |
| 15 | | 4.1 | Overall software structure |
| 16 | | 4.2 | task configuration |
| 17 | 5 | | Architectural design |
| 18 | | 5.1 | Memory configuration / Layout |
| 19 | | 5.2 | Design strategies |
| 20 | | 5.3 | Performance estimation |
| 21 | | 5.4 | Design rationales |
| 22 | 6 | | Details on functional units |
| 23 | | 6.1 | API specifications and data definitions |
| 24 | | 6.2 | Event definitions |
| 25 | 7 | | Others |
| 26 | | 7.1 | List of errors/information on abnormalities |
| 27 | | 7.2 | Details of the memory area for software used to control common information |

123a 123b 123c 123d → 123

FIG. 5
| No. | CLASSIFICATION | DIAGRAM NAME | ABBRE-VIATION |
|---|---|---|---|
| 1 | CONFIGURATION | PACKAGE DIAGRAM | pkg |
| 2 | REQUIREMENT | REQUIREMENT DIAGRAM | req |
| 3 | BEHAVIOR | USE CASE DIAGRAM | uc |
| 4 | | SEQUENCE DIAGRAM | seq |
| 5 | | ACTIVITY DIAGRAM | act |
| 6 | | STATE MACHINE DIAGRAM | stm |
| 7 | RESTRICTION | PARAMETRIC DIAGRAM | par |
| 8 | CONFIGURATION | BLOCK DEFINITION DIAGRAM | bdd |
| 9 | | INTERNAL BLOCK DIAGRAM | ibd |
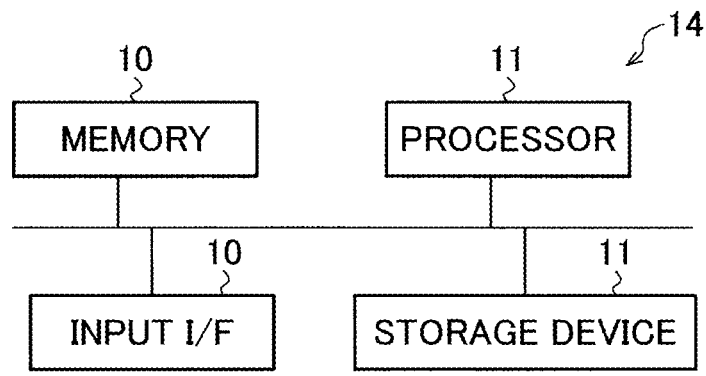
FIG. 6
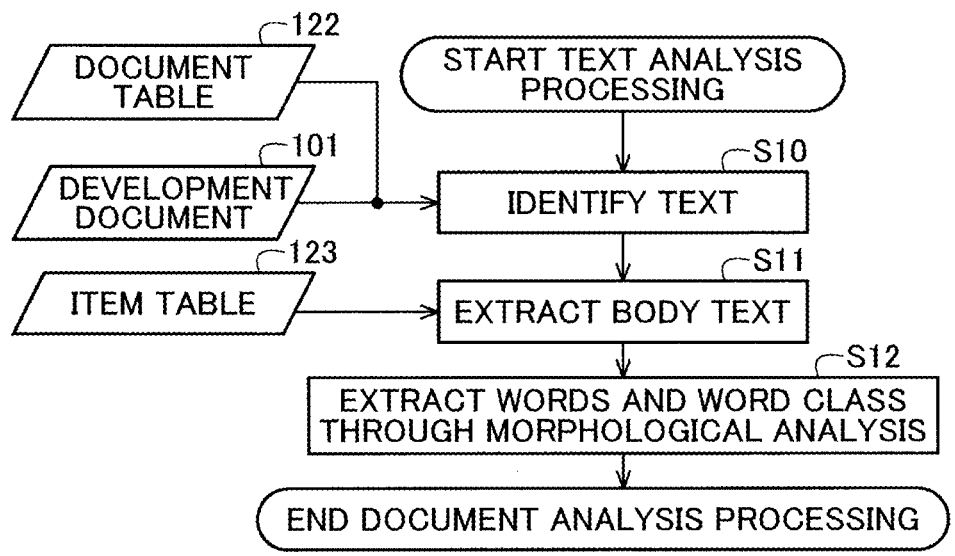
FIG. 7

DEVELOPMENT SUPPORT DEVICE, NON-TRANSITORY COMPUTER-READABLE MEDIUM, AND DEVELOPMENT SUPPORT METHOD

CROSS-REFERENCE TO RELATED APPLICATION

The present application is based on PCT filing PCT/JP2020/024064, filed Jun. 19, 2020, the entire contents of which is incorporated herein by reference.

TECHNICAL FIELD

The disclosure relates to a development support device, a non-transitory computer-readable medium, and a development support method.

BACKGROUND ART

In a product development process, documents such as specifications and designs are created to record required items and design information and communicate them to others; however, there is a problem in that the author's intent intervenes in the creation of the document and the ways to understand the document differ depending on the readers.

The design information and development information span across various domains and are associated with each other in a very complex way. This causes problems of low readability of documents representing such information, refactoring in the development process, and inefficient development.

In order to solve these problems, it is becoming common to represent required items and design information through a model using a description language such as systems modeling language (SysML).

Patent Literature 1 discloses a business process diagram generating device including a storage means for storing reconstruction rule information indicating a rule for converting a standardized document including a use case table, class definition, and an operation table into structured data; a data reconstruction means for capturing a standardized document to convert the standardized document into structured data by referring to the reconstruction rule information; a subprocess analysis means for performing natural language processing on the structured data of the use case table and generating structured data obtained by converting the processing content indicated in the use case table into a state machine diagram; and a process conversion means for generating a business process diagram by using each structured data of the use case table, the class definition, the operation table, and the state machine diagram. This can automatically generate a business process diagram.

PRIOR ART REFERENCE

Patent Reference

Patent Literature 1: Japanese Patent Application Publication No. 2016-218851

SUMMARY OF THE INVENTION

Problem to be Solved by the Invention

In the conventional technique, a business process diagram is automatically generated by capturing a standardized document and analyzing each item listed in the standardized document. However, a development document that has already been created does not necessarily follow the format of the standardized document described in the conventional technique. Thus, according to the conventional technique, in some cases, a model cannot be created from existing development documents.

Accordingly, it is an object of one or more aspects of the disclosure to readily create a model from existing development documents.

Means of Solving the Problem

A development support device according to a first aspect of the disclosure includes a document analyzing unit configured to analyze a described matter in a development document created in a development process, and specify a function described in the development document; a component generating unit configured to specify a model corresponding to the specified function, and generate a plurality of components conforming to a standardized format with respect to the specified model by using an analysis result of the described matter; and a model generating unit configured to incorporate a component selected from the plurality of components in accordance with the format to generate the specified model.

A development support device according to a second aspect of the disclosure includes a document analyzing unit configured to analyze a described matter in a development document created in a development process, and specify a function described in the development document; a synonym analyzing unit configured to specify a plurality of groups in an analysis result by the document analyzing unit, the group each including a plurality of words included in the described matter and having similar meanings; and a superordinate glossary generating unit configured to generate a superordinate glossary including information indicating a relationship between the groups and locations where the words included in the groups appear in the development document.

A program according to a first aspect of the disclosure includes a document analyzing unit configured to analyze a described matter in a development document created in a development process, and specify a function described in the development document; a component generating unit configured to specify a model corresponding to the specified function, and generate a plurality of components conforming to a standardized format with respect to the specified model by using an analysis result of the described matter; and a model generating unit configured to incorporate a component selected from the plurality of components in accordance with the format to generate the specified model.

A program according to a second aspect of the disclosure includes a document analyzing unit configured to analyze a described matter in a development document created in a development process, and specify a function described in the development document; a synonym analyzing unit configured to specify a plurality of groups in an analysis result by the document analyzing unit, the group each including a plurality of words included in the described matter and hating similar meanings; and a superordinate glossary generating unit configured to generate a superordinate glossary including information indicating a relationship between the groups and locations where the words included in the groups appear in the development document.

A development support method according to a first aspect of the disclosure includes analyzing a described matter in a development document created in a development process, and specifying a function described in the development document; specifying a model corresponding to the specified function; generating a plurality of components conforming to a standardized format with respect to the specified model by using an analysis result of the described matter; and incorporating a component selected from the plurality of components in accordance with the format to generate the specified model.

A development support method according to a second aspect of the disclosure includes analyzing a described matter in a development document created in a development process, and specifying a function described in the development document; specifying a plurality of groups in an analysis result of the development document, the group each including a plurality of words included in the described matter and having similar meanings; and generating a superordinate glossary including information indicating a relationship between the groups and locations where the words included in the groups appear in the development document.

Effects of the Invention

According to one or more aspects of the disclosure, a model can be readily created from existing development documents.

BRIEF DESCRIPTION OF THE DRAWINGS

FIG. 4 is a schematic diagram illustrating an example of an item table.

FIG. 5 is a schematic diagram illustrating an example of management information of a model format collection.

FIG. 6 is a block diagram illustrating a hardware configuration example.

FIG. 7 is a flowchart illustrating analysis processing by a text analyzing unit.

MODE FOR CARRYING OUT THE INVENTION

First Embodiment

Figure 1:
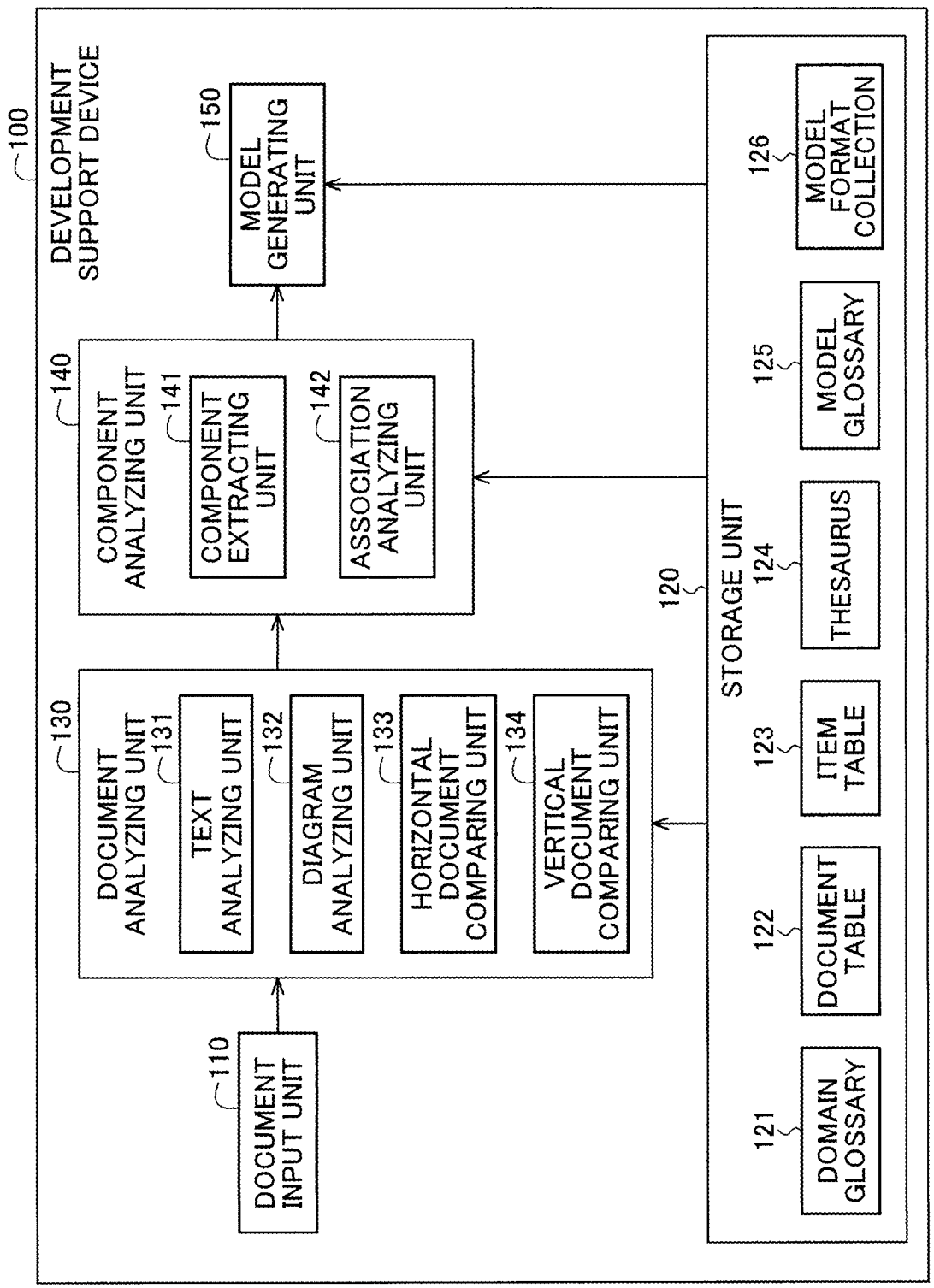
FIG. 1 is a block diagram schematically illustrating the configuration of a development support device according to a first embodiment.

FIG. 1 is a block diagram schematically illustrating the configuration of a development support device 100 according to the first embodiment.

The development support device 100 includes a document input unit 110, a storage unit 120, a document analyzing unit 130, a component analyzing unit 140, and a model generating unit 150.

The development support device 100 is used when an existing product development process has been completed, and another associated product development process is started. The development support device 100 has a function of generating a model from development documents that have been created during the existing product development that has been completed.

The document input unit 110 accepts input of multiple development documents. The accepted development documents 101 are loaded to the document analyzing unit 130.

A development document is created in each step of product development.

Figures 2, 3:
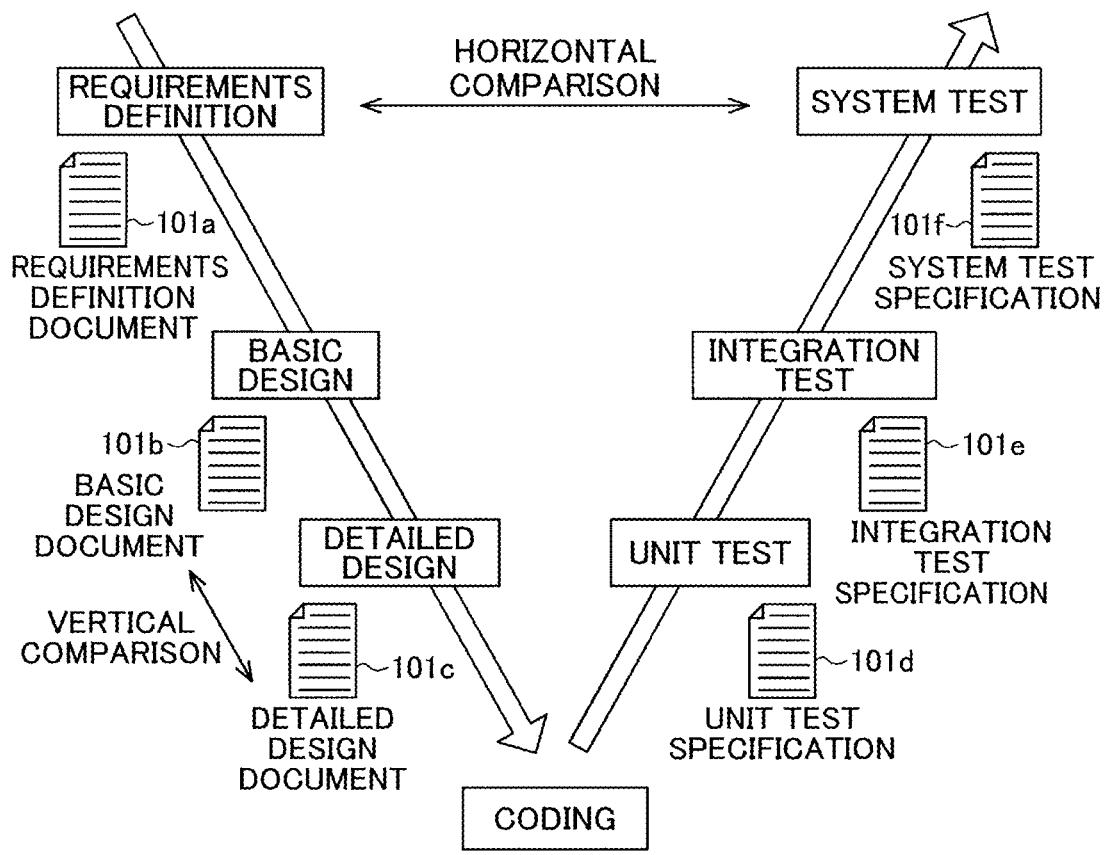
FIG. 2 is a schematic diagram illustrating an example of development documents created in the respective steps of product development.
FIG. 3 is a schematic diagram illustrating an example of a document table.

FIG. 2 is a schematic diagram illustrating an example of development documents created in the respective steps of product development.

In FIG. 2, it is presumed that development proceeds in the order of the following steps: requirements definition, basic design, detailed design, coding, unit test, integration test, and system test. In each of the development steps, a requirements definition document 101a, a basic design document 101b, a detailed design document 101c, a unit test specification 101d, an integration test specification 101e, and a system test specification 101f are created as development documents.

Hereinafter, each of the development documents is generally referred to as a development document 101.

There is an association between the design content and the test content of the development steps. Adjacent development steps are associated with each other; for example, there is an association between the requirements definition step and the basic design step in that the functions that implement the requirements listed in the requirements definition document 101a are listed in the basic design document 101b. Such an association is hereinafter referred to as a vertical association.

The development steps are divided at the coding step into upstream steps that are design phases and downstream steps that are test phases. There is also an association between the design content and the test content of the upstream steps and the design content and the test content of the downstream steps. For example, there is an association in which items for testing the functions listed in the basic design document 101*b* are listed in the integration test specification 101*e* because the functions listed in the basic design document 101*b* are subjected to an integration test to check whether or not the functions are correctly implemented. Such an association is hereinafter referred to as a horizontal association.

The development support device 100 according to the present embodiment uses the vertical association and the horizontal association to compare corresponding development documents 101. The comparison using the vertical association is hereinafter referred to as vertical comparison, and the comparison using the horizontal association is hereinafter referred to as horizontal comparison.

Referring back to FIG. 1, the storage unit 120 stores programs and data necessary for processing in the development support device 100. For example, the storage unit 120 stores various types of data items: a domain glossary 121, a document table 122, an item table 123, a thesaurus 124, a model glossary 125, and a model format collection 126.

The domain glossary 121 is data on a glossary relating to the field to which the development target pertaining to the development documents 101 belongs. For example, if the development target is an industrial robot, the field is "industrial equipment," and terms such as "actuator," "arm," "degree of freedom," and "joint" are presumed to be recorded in the domain glossary 121.

The document table 122 is data indicating the association between development documents 101.

FIG. 3 is a schematic diagram illustrating an example of the document table 122.

As illustrated in FIG. 3, the document table 122 is data in a table format having an identification number column 122*a*, a document name column 122*b*, a preceding document column 122*c*, a following document column 122*d*, and a relative document column 122*e*.

The identification number column 122*a* stores document numbers, which are identification numbers for uniquely identifying the development documents 101.

The document name column 122*b* stores document names, which are identification information for identifying the development documents 101. As long as the development documents 101 is identifiable, other information such as file names or document identifications (IDs) may be used in place of document names.

The preceding document column 122*c* stores the document numbers of the development documents 101 created in the preceding step in the vertical association with the corresponding development documents 101 identified by the identification number column 122*a* and the document name column 122*b*. For example, the preceding document column 122*c* for the development document 101 having the document name "basic design document" stores the document number "1" indicating the development document 101 having the document name "requirements definition document," which is created in a preceding step having a vertical association with the basic design document.

The following document column 122*d* stores the document numbers of the development documents 101 created in the following step in the vertical association with the corresponding development documents 101 identified by the identification number column 122*a* and the document name column 122*b*. For example, the following document column 122*d* for the development document 101 having the document name "basic design document" stores the document number "3" indicating the development document 101 having the document name "detailed design document," which is created in a following step having a vertical association with the basic design document.

The relative document column 122*e* stores the document numbers of the development documents 101 having a horizontal association with the corresponding development documents 101 identified by the identification number column 122*a* and the document name column 122*b*. For example, the relative document column 122*e* for the development document 101 having the document name "basic design document" stores the document number "5" indicating the development document 101 having the document name "integration test specification," which is created in a step having a horizontal association with the basic design document.

Although document numbers are stored in the preceding document column 122*c*, the following document column 122*d*, and the relative document column 122*e*, any information that enables identification of the development documents 101 can be stored. For example, the information may be document names, file names, or document IDs.

Referring back to FIG. 1, the item table 123 is data indicating items in the development documents 101.

FIG. 4 is a schematic diagram illustrating an example of the item table 123.

As illustrated in FIG. 4, the item table 123 is data in a table format having a row number column 123*a*, a chapter number column 123*b*, a section number column 123*c*, and a title column 123*d*.

Basically, it is presumed that one item table 123, such as that illustrated in FIG. 4, is provided for one development document 101. It is also presumed that the development document 101 has one or more chapters, and each chapter contains one or more sections.

However, there may be a development document 101 without an item table.

The row number column 123*a* stores row numbers for identifying the rows of the item table 123.

The chapter number column 123*b* stores chapter numbers, which are identification numbers for identifying the chapters of the development document 101.

The section number column 123*c* stores section numbers, which are identification numbers for identifying the sections of the development document 101.

The title column 123*d* stores the titles of the chapters and the sections.

As described above, the item table 123 is data including chapter numbers, section numbers, and titles, but may include additional information such as information indicating the content of the chapters and the sections, and the page numbers of the first pages of the chapters and the sections.

Referring back to FIG. 1, the thesaurus 124 is data of a glossary that groups terms having similar meanings. The thesaurus 124 may contain a general thesaurus or may be independently constructed. The document analyzing unit 130 may update the thesaurus 124 by adding the terms used in the development documents 101 dynamically input during the analysis processing in accordance with the development documents 101 during the analysis of the development documents 101.

The model glossary 125 is data containing terms related to models. The model glossary 125 contains terms of, for example, architecture, entity, system, metamodel, or life cycle. These may be names of components constituting the model or terms expressing concepts in modeling.

The model format collection 126 is data containing information indicating diagrams indicating models defined on the basis of standardized documents of a unified modeling language (UML), SysML, or the like and the components in the diagrams, and the information indicates the relationships such as the display format of the diagrams and lines. In other words, the model format collection 126 indicates, for each model, which components are arranged at which positions according to the standardized document.

FIG. 5 is a schematic diagram illustrating an example of management information of the model format collection 126.

The management information of the model format collection 126 is data in a table format having a diagram number column 126*a*, a classification column 126*b*, a diagram name column 126*c*, and an abbreviation column 126*d*.

The diagram number column 126*a* stores the diagram numbers, which are identification information for identifying models or diagrams.

The classification column 126*b* stores the classification of the models or diagrams.

The diagram name column 126*c* stores diagram names, which are identification information for identifying the models or diagrams.

The abbreviation column 126*d* stores abbreviations of the models or diagrams.

Although not illustrated, the model format collection 126 includes configuration information indicating what information each model contains, what display format (e.g., figures, lines, or combinations these) is used, and what configuration it has. For example, a sequence diagram in a standardized document represents, in chronological order, the flow of messages between objects that are the components of the sequence diagram, and contains the survival (lifeline) of the objects, messages, event occurrences, execution occurrences, and interaction occurrences in association with the occurrence order of events; an example of configuration information is information about the meaning of these events, their positional relation, and how they are represented as figures.

As described above, various types of data such as a thesaurus and a glossary are stored in the storage unit 120, and the analysis by the document analyzing unit 130 can be supported by referring to such data.

Referring back to FIG. 1, the document analyzing unit 130 analyzes the development documents 101 supplied from the document input unit 110, and gives the analysis results to the component analyzing unit 140.

For example, the document analyzing unit 130 analyzes the described matters described in the development documents 101 created in the development steps, and specifies the functions described in the development documents 101.

Specifically, the document analyzing unit 130 refers to the document table 122 or compares the contents of the respective development documents 101 to analyze which development document 101 is associated with which step in the existing product development process in which the input development documents 101 have been used, and analyzes the text portions and the diagram portions of the development documents 101 as the described matters to extract the functions described in the respective development documents 101. Note that the document analyzing unit 130 should refer to the item tables 123 to analyze the described matters in the development documents.

The document analyzing unit 130 includes a text analyzing unit 131, a diagram analyzing unit 132, a horizontal document comparing unit 133, and a vertical document comparing unit 134.

The text analyzing unit 131 specifies functions by analyzing the text portions of the development documents 101 as described matters.

For example, the text analyzing unit 131 analyzes the text portions in the development documents 101 to extract words from the text portions, and specifies a word relationship that is a predetermined relationship between the extracted words in the text. The word relationship may be, for example, a close relation in which the positions of the words in the text are close, a subject/verb relation, or a modification relation.

The text analyzing unit 131 specifies functions on the basis of the meaning or content of a word group having word relationships. For example, when the verb "send" or a word synonymous with the verb "send" is placed between the word at a position corresponding to the subject and the word at the position corresponding to an object, a communication function that is a function associated with the verb "send" can be specified by analyzing this word group.

The text analyzing unit 131 generates text analysis results indicating a word group, word relationships in the word group, and specified functions.

The text analyzing unit 131 refers to the item table 123 to extract and analyze the text portions in a document. The text analyzing unit 131 is also expected to support text analysis by referring to the domain glossary 121, the thesaurus 124, and the model glossary 125.

The diagram analyzing unit 132 specifies functions by analyzing the diagram portions in the development documents 101 as described matters.

For example, the diagram analyzing unit 132 extracts and analyzes the diagram portion of the development documents 101, to extract the constituent elements of the diagrams or words included in the diagrams as described matters. At this time, the diagram analyzing unit 132 may refer to the item tables 123 to extract the diagram portions.

For example, the diagram analyzing unit 132 refers to the model format collection 126 to specify diagram relationships that are predetermined relationships between the constituent elements of the diagrams. A diagram relationship is a structure between constituent elements, such as position, role, or association in diagrams. For example, the diagram analyzing unit 132 refers to the model format collection 126 to specify the diagram type (e.g., sequence diagram, use case diagram, etc.) of the diagram portions in the development documents 101. For example, if a diagram portion is a sequence diagram, the diagram analyzing unit 132 extracts, as the lifelines of the sequence diagram, constituent elements representing object names or class names used in sequence diagrams. The extracted lifelines correspond to the diagram relationship.

The diagram analyzing unit 132 specifies a function from the meaning or content of a constituent element group having a diagram relationship.

The diagram analyzing unit 132 extracts the words in a diagram and specifies the word relationship that is a predetermined relationship between the extracted words in the text. The diagram analyzing unit 132 specifies a function from the meaning or content of a word group having a word relationship.

The diagram analyzing unit 132 then generates diagram analysis results indicating the constituent element group, the diagram relationship in the constituent element group, and the specified functions, or diagram analysis results indicating the word group, the word relationship in the word group, and the specified functions.

The horizontal document comparing unit 133 compares and analyzes the content described in combinations of the development documents 101 having a horizontal association among the input development documents 101. In the case of the document table 122 for FIG. 2, there are three combinations of development documents 101 having a horizontal association.

The horizontal document comparing unit 133 compares the functions corresponding to the description in one development document 101 with the functions corresponding to the description in another development document 101 having a horizontal association with the one development document 101 on the basis of the analysis results from the text analyzing unit 131 and the diagram analyzing unit 132, and determines whether or not any of the functions described in the development documents 101 are missing. If a function is missing, the horizontal document comparing unit 133 specifies the function determined to be missing as a function corresponding to the description in the development documents 101.

The vertical document comparing unit 134 compares and analyzes the content of the combinations of development documents 101 having a vertical association among the input development documents 101. In the case of the document table 122 for FIG. 2, there are four combinations of development documents 101 having a vertical association.

The vertical document comparing unit 134 compares the functions corresponding to the description in one development document 101 with the functions corresponding to the description in another development document 101 having a vertical association with the one development document 101 on the basis of the analysis results from the text analyzing unit 131 and the diagram analyzing unit 132, and determines whether or not any of the functions corresponding to the description in the development documents 101 are missing. If a function is missing, the vertical document comparing unit 134 specifies the function determined to be missing as a function corresponding to the description in the development documents 101.

The component analyzing unit 140 is a component generating unit that specifies a model corresponding to the functions specified by the document analyzing unit 130, and generates multiple components conforming to the standardized format with respect to the specified model by using the analysis results of described matters in the development documents.

For example, to receive the document analysis results from the document analyzing unit 130 and generate a model using a predetermined format based on the content of the development documents 101, the component analyzing unit 140 generates the components constituting the model, and generates component information indicating the generated components and their description destination and association information indicating the association between the pieces of component information. Here, the predetermined format is a format defined by a standardized document of UML, SysML, or the like.

Specifically, the component analyzing unit 140 specifies the functions, specifies the model corresponding to the specified functions, and generates the components of the specified model by using at least one of the word groups or constituent element groups corresponding to the specified functions.

The component analyzing unit 140 specifies the association between components indicated by the component information and generates the association information associating the components having the specified association with each other.

For example, the component analyzing unit 140 specifies two or more components corresponding to a specified function out of the generated components as components having an association with each other, and generates the association information indicating the two or more components.

The component analyzing unit 140 includes a component extracting unit 141 and an association analyzing unit 142.

The component extracting unit 141 specifies the functions indicated by the document analysis results from the document analyzing unit 130. The component extracting unit 141 specifies the model corresponding to the specified functions. The component extracting unit 141 also generates the components of the specified model from at least one of the word groups and the constituent element groups corresponding to the specified functions. The component extracting unit 141 generates component information associating the function, the generated components, and the model, which is the description destination. Here, the component extracting unit 141 may specify multiple models corresponding to the specified functions.

The association analyzing unit 142 specifies the association between the components indicated by the component information generated by the component extracting unit 141, and generates association information associating the pieces of component information indicating the components having the specified association. The association here indicates that multiple components correspond to the same function. The association also indicates an association between multiple components, for example, an association in which the same component is used for multiple functions, or a hierarchical relation (inclusive relation) between the components. The association information allows components corresponding to the same function to be associated with each other. This allows the components included in multiple models to be associated with each other even when multiple models are generated in correspondence to one function.

The component analyzing unit 140 gives the document analysis results from the document analyzing unit 130, the component information, and the association information to the model generating unit 150.

The model generating unit 150 generates a model using a predetermined format on the basis of the document analysis results from the document analyzing unit 130 and the component information and the association information from the component analyzing unit 140.

For example, the model generating unit 150 selects the components to be incorporated into the model from the components generated by the component analyzing unit 140 in accordance with the format, and incorporates the selected components to generate the specified model.

Specifically, the model generating unit 150 generates the specified model by incorporating the generated components in accordance with the type of the specified model. Specifically, if the type of the model to be generated is a sequence diagram, the model format collection 126 describes that the survival (lifelines) of the objects, messages, event occurrences, execution occurrences, and interaction occurrences are included in the sequence diagram, so that the model generating unit 150 can generate the sequence diagram by specifying the behavior of each component analyzed by the component analyzing unit 140 on the basis of the analysis results from the document analyzing unit 130.

The model is a diagram such as an activity diagram or a sequence diagram expressed in SysML. The model generating unit 150 may generate multiple models.

The development support device 100 described above can be implemented, for example, by a computer 14 including a memory 10, a processor 11, such as a central processing unit (CPU), that executes the programs stored in the memory 10, an input interface (input I/F) 12, and a storage device 13, as illustrated in FIG. 6.

For example, the document analyzing unit 130, the component analyzing unit 140, and the model generating unit 150 can be implemented by the processor 11 executing the programs stored in the memory 10. Such programs may be provided via a network or may be recorded and provided on a recording medium. That is, such programs may be provided as, for example, program products.

The document input unit 110 can be implemented by the input I/F 12 used by the processor 11. The input I/F 12 may be any device capable of inputting data, and may be a connection interface using a universal serial bus (USB), a communication interface such as a connection interface using a network interface card (NIC), or the like.

The storage unit 120 can be implemented by the storage device 13 used by the processor 11. The storage device 13 is a storage device, such as a non-volatile memory, a hard disk drive (HDD), or a solid state drive (SSD).

The processing in the development support device 100 will now be explained.

FIG. 7 is a flowchart illustrating analysis processing by the text analyzing unit 131.

The text analyzing unit 131 sequentially reads the development documents 101 one by one, and identifies the read development documents 101, for example, by referring to the document table 122 (step S10).

The text analyzing unit 131 extracts the text portions of the identified development documents 101 by referring to the item tables 123 (step S11). For example, the text analyzing unit 131 can extract text portions of the development documents 101 by analyzing the data of the development documents 101 and extracting text.

The text analyzing unit 131 breaks up the extracted text portions into words by using a technique such as morphological analysis and analyzes the relationship between the words to specify the word relationship. The text analyzing unit 131 generates, from the specified word relationship, document analysis results indicating a specified word group, the relationship between the words in the word group, and the function that can be specified on the basis of the word group (step S12).

Figure 8:
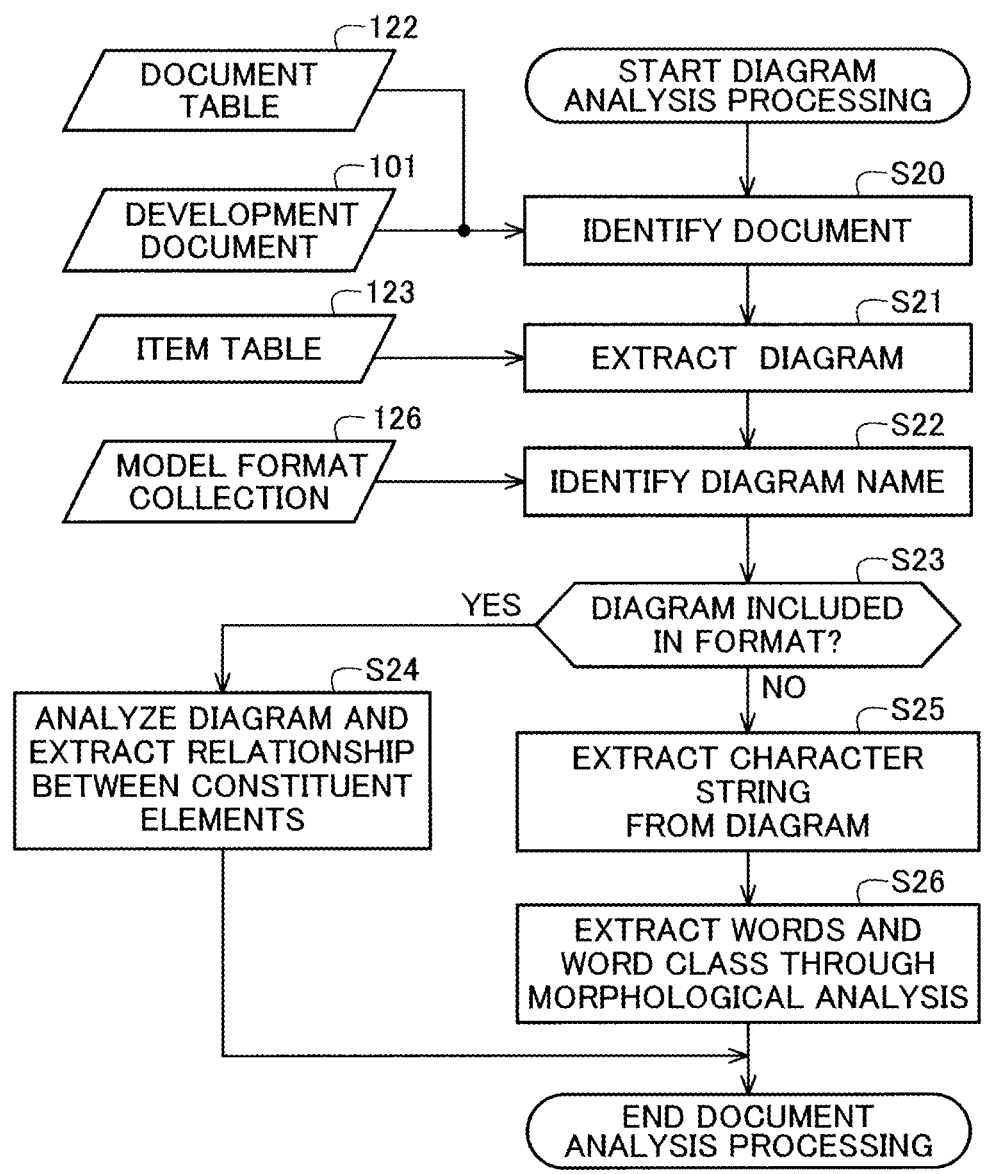
FIG. 8 is a flowchart illustrating analysis processing by a diagram analyzing unit.

FIG. 8 is a flowchart illustrating the analysis processing by the diagram analyzing unit 132.

The diagram analyzing unit 132 sequentially reads the development documents 101 one by one, and identifies the read development documents 101, for example, by referring to the document table 122 (step S20).

The diagram analyzing unit 132 extracts the diagram portions of the identified development documents 101 by referring to the item table 123 (step S21). For example, the diagram analyzing unit 132 may extract portions of the read development document 101 other than the text portions as diagram portions.

The diagram analyzing unit 132 identifies the diagram name of an extracted diagram portion by referring to the model format collection 126 (step S22). For example, the diagram analyzing unit 132 compares the structure of the extracted diagram portion with the structure indicated by the configuration information in the model format collection 126, to identify the diagram name of the extracted diagram portion. Specifically, in the case of a UML use case diagram, the extracted diagram portion includes actors having a shape representing a person, use cases having an elliptical shape, and lines connecting the actors and the use cases. Thus, when the structure of the extracted diagram portion is formed of shapes representing a person, elliptical shapes, and solid lines, the diagram analyzing unit 132 can refer to the structure indicated by the configuration information to identify the extracted diagram portion as a use case diagram.

The diagram analyzing unit 132 determines whether or not the diagram name of the extracted diagram portion has been identified (step S23). If the diagram name is identified (Yes in step S23), the processing proceeds to step S24; if not identified (No in step S23), the processing proceeds to step S25.

In step S24, the diagram analyzing unit 132 analyzes the extracted diagram portion by referring to the model format collection 126, specifies the relationship between constituent elements in the constituent elements group, which is a subgroup included in the diagram portion, as the diagram relationship, and, on the basis of the specified diagram relationship, generates diagram analysis results indicating the specified constituent element group, the diagram relationship, and the function specified from the constituent element group.

In step S25, the diagram analyzing unit 132 extracts a character string from the extracted diagram portion. For example, the diagram analyzing unit 132 can extract a character string from the extracted diagrams by using optical character recognition (OCR).

The diagram analyzing unit 132 breaks down the extracted character string into words by using a technique such as morphological analysis and analyzes the relationship between the words to specify the word relationship. The diagram analyzing unit 132 generates, from the specified word relationship, diagram analysis results indicating the specified word group, the word relationship, and the function that can be specified from the word group (step S26). In addition, figure information such as line segments included in the diagram may be analyzed to associate information on the association between words.

Figure 9:
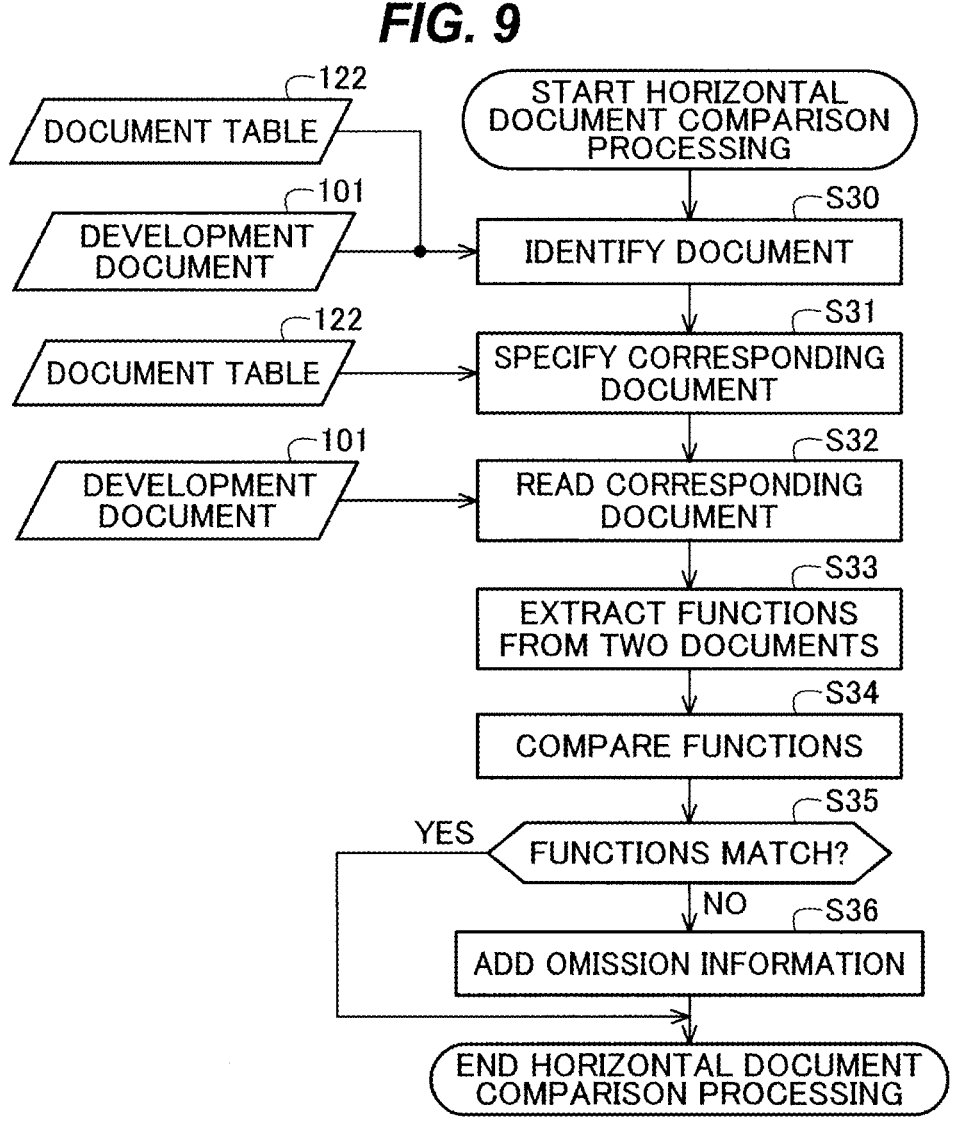
FIG. 9 is a flowchart illustrating processing by a horizontal document comparing unit.

FIG. 9 is a flowchart illustrating the processing by the horizontal document comparing unit 133.

The horizontal document comparing unit 133 sequentially reads the development documents 101 one by one, and identifies the read development documents 101, for example, by referring to the document table 122 (step S30).

The horizontal document comparing unit 133 then refers to the document table 122, and specifies the development documents 101 having a horizontal association with the identified development documents 101 (step S31). Hereinafter, a development document 101 identified in step S30 will be referred to as a target development document, and a development document 101 having a horizontal association with the target development document will be referred to as a horizontal development document.

The horizontal document comparing unit 133 then reads the horizontal development document (step S32).

The horizontal document comparing unit 133 then specifies functions in the target development document and the horizontal development document, and extracts the specified functions (step S33). As for the function specifying method, the functions may be specified in the same manner as by the text analyzing unit 131 or the diagram analyzing unit 132. Alternatively, the horizontal document comparing unit 133 may specify the functions through other methods.

The horizontal document comparing unit 133 then compares the functions of the target development document with the functions of the horizontal development document (step S34).

The horizontal document comparing unit 133 determines whether or not the functions of the target development document match the functions of the horizontal development document (step S35). When the functions of the target development document do not match the functions of the horizontal development document (No in step S35), the processing proceeds to step S36.

In step S36, the horizontal document comparing unit 133 adds omission information indicating a missing function to the development document 101 that is missing the unmatched function.

Such omission information may be output together with identification information (for example, document number) indicating the development document 101 that is missing a function when the model generated by the model generating unit 150 is output. By presenting such information, the missing function can be specified.

Figure 10:
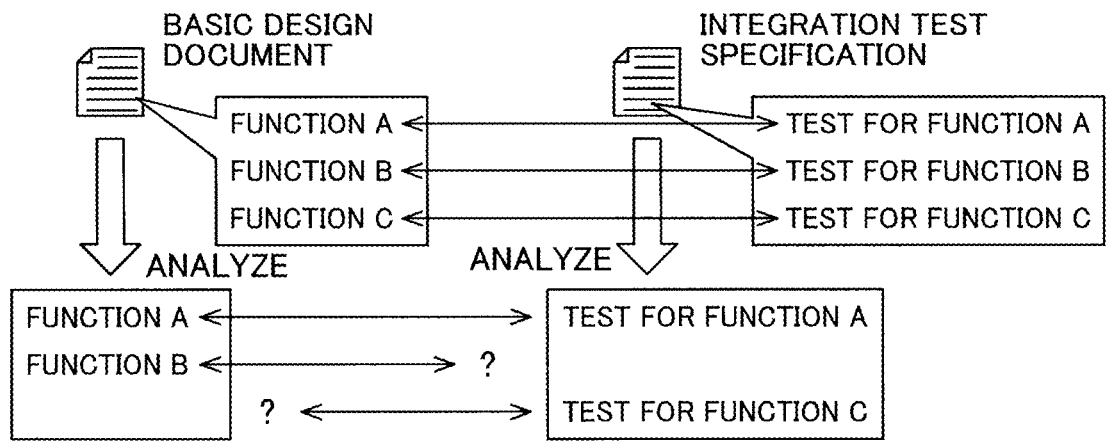
FIG. 10 is a schematic diagram for explaining a comparison of functions by a horizontal document comparing unit.

FIG. 10 is a schematic diagram for explaining the comparison of the functions by the horizontal document comparing unit 133.

Here, a case in which the target development document is the basic design document 101b and the horizontal development document is the integration test specification 101e will be explained.

The basic design document 101b describes the functions that implement the requirements described in the requirements definition document 101a. Ideally, the corresponding integration test specification 101e lists test items of functions corresponding to all functions described in the basic design document 101b.

The horizontal document comparing unit 133 extracts functions from each of the basic design document 101b and the integration test specification 101e, as illustrated in FIG. 10.

At this time, as illustrated in FIG. 10, the basic design document 101b actually describes three functions A, B, and C, but the horizontal document comparing unit 133 extracts the functions A and B. The function C is not extracted due to the performance limitations of the horizontal document comparing unit 133, or the style of text, the wording used, or the description method of diagrams of the basic design document 101b.

Similarly, the integration test specification 101e actually describes the tests for the functions A, B, and C, but the horizontal document comparing unit 133 extracts the tests for the functions A and C. The test for the function B is not extracted due to the performance limitations of the horizontal document comparing unit 133, or the style of text, the wording used, or the description method of diagrams of the integration test specification 101e.

In such a situation, a comparison of the functions extracted from the basic design document 101b with the functions extracted from the integration test specification 101e detects that the function C is not extracted from the basic design document 101b and the function B is not extracted from the integration test specification 101e. Thus, the horizontal document comparing unit 133 adds the omission information indicating the function C to the basic design document 101b, and adds the omission information indicating the function B to the integration test specification 101e.

The cause of the omission may be omission of the description in the basic design document 101b or the integration test specification 101e to be analyzed.

As described above, the effect is that, by performing the horizontal comparison of the development documents 101, it is possible to supplement the performance limitations of the text analyzing unit 131 or the diagram analyzing unit 132, and at the same time, accurate analysis can be performed even when there are failures such as omissions in the descriptions in the read development documents 101.

Figure 11:
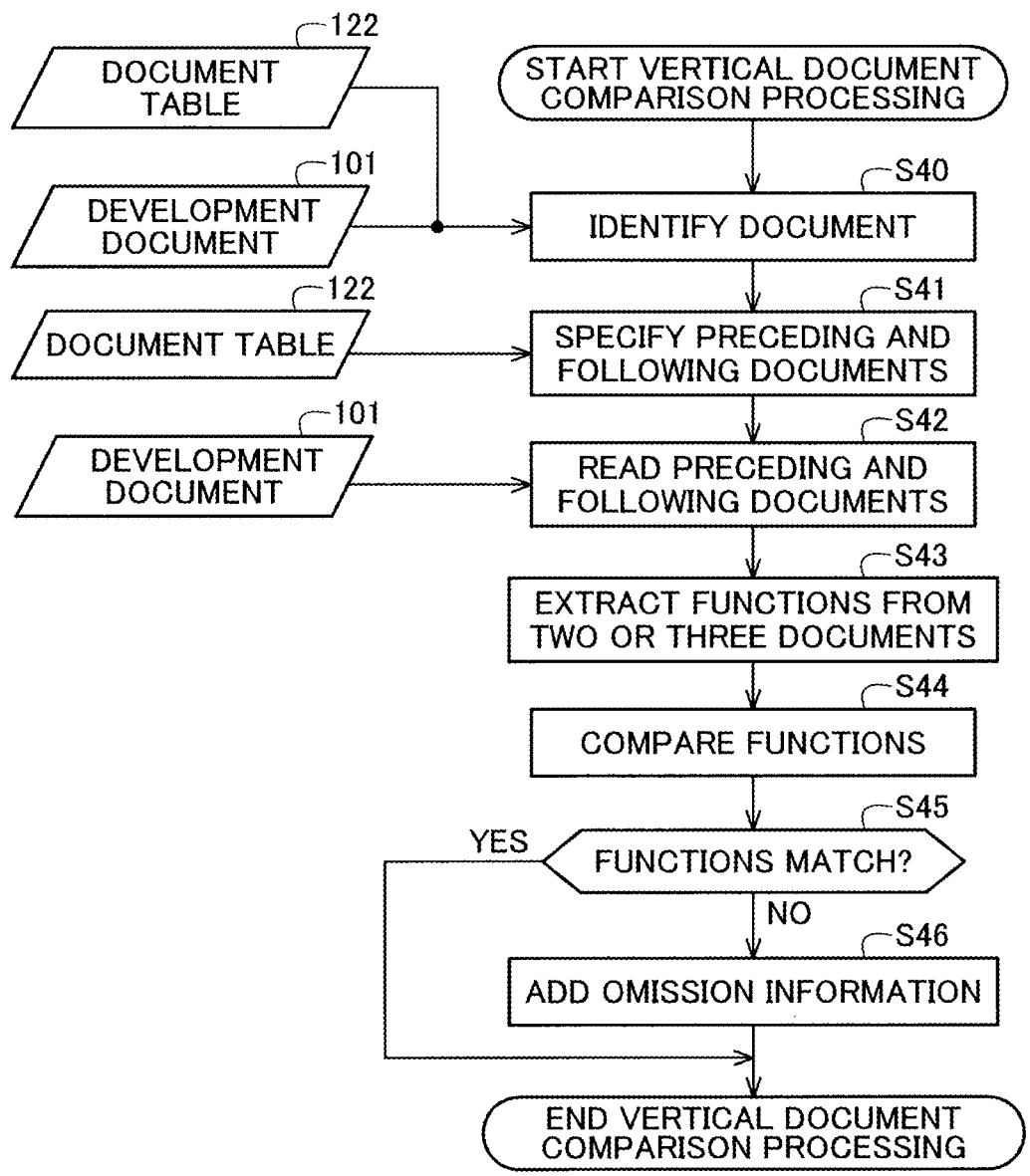
FIG. 11 is a flowchart illustrating processing by a vertical document comparing unit.

FIG. 11 is a flowchart illustrating the processing by the vertical document comparing unit 134.

The vertical document comparing unit 134 sequentially reads the development documents 101 one by one, and identifies the read development documents 101, for example, by referring to the document table 122 (step S40).

The vertical document comparing unit 134 then refers to the document table 122, and specifies the development documents 101 having a vertical association with respect to the identified development documents 101 (step S41). Hereinafter, a development document 101 identified in step S40 will be referred to as a target development document, and the development document 101 having a vertical association with the target development document will be referred to as a vertical development document. Depending on the target development document, one or two vertical development documents are specified. For example, in the case of FIG. 2, one vertical development document is specified when the target development document is the requirements definition document 101a, the detailed design document 101c, the unit test specification 101d, or the system test specification 101f, and two vertical development documents are specified when the target development document is the basic design document 101b or the integration test specification 101e.

The vertical document comparing unit 134 then reads the one or two vertical development documents (step S42).

The vertical document comparing unit 134 then specifies functions in the target development document and the one or two vertical development documents, and extracts the specified functions (step S43). As for the function specifying method, the functions may be specified in the same manner as by the horizontal document comparing unit 133.

The vertical document comparing unit 134 then compares the functions of the target development document with the functions of the one or two vertical development documents (step S44).

The vertical document comparing unit 134 determines whether or not the functions of the target development document match the functions of the one or two vertical development documents (step S45). When the functions of the target development document do not match the functions of the one or two vertical development documents (No in step S45), the processing proceeds to step S46.

In step S46, the vertical document comparing unit 134 adds omission information indicating a missing function to the development document 101 that is missing the unmatched function.

Such omission information may be output together with identification information (for example, document number) indicating the development document 101 that is missing a function when the model generated by the model generating unit 150 is output. By presenting such information, the missing function can be specified.

Figure 12:
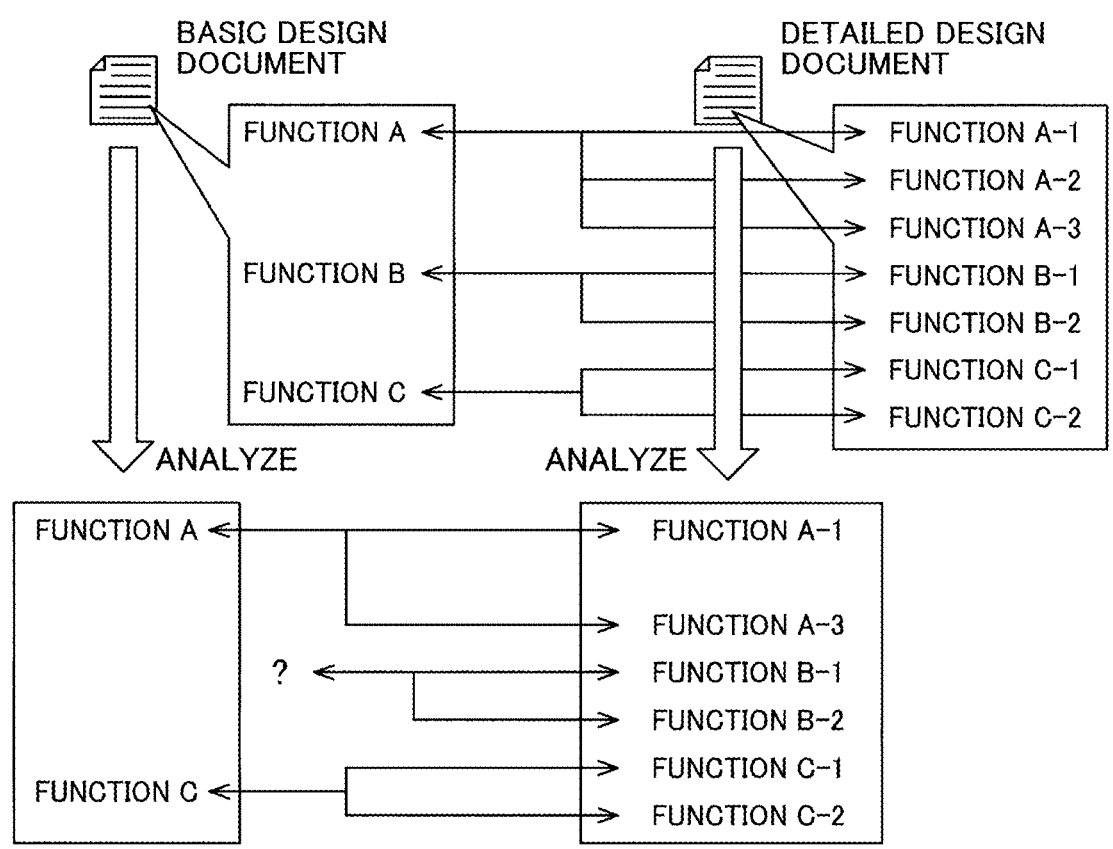
FIG. 12 is a schematic diagram for explaining a comparison of functions by a vertical document comparing unit.

FIG. 12 is a schematic diagram for explaining the comparison of the functions by the vertical document comparing unit 134.

For simplicity, a case in which two development documents 101 are compared will be described. The comparison of three development documents 101 can be achieved by comparing two development documents 101 two or three times and integrating the results.

Here, a case in which the target development document is the basic design document 101b and the vertical development document is the detailed design document 101c will be described.

The basic design document 101*b* describes the functions that implement the requirements described in the requirements definition document 101*a*. Ideally, the detailed design document 101*c* describes the detailed functions implementing all functions described in the basic design document 101*b*.

The vertical document comparing unit 134 extracts functions from each of the basic design document 101*b* and the detailed design document 101*c*, as illustrated in FIG. 12.

At this time, as illustrated in FIG. 12, the basic design document 101*b* actually describes three functions A, B, and C, but the vertical document comparing unit 134 extracts the functions A and C. The function B is not extracted due to the performance limitations of the vertical document comparing unit 134, or the style of text, the wording used, or the description method of diagrams of the basic design document 101*b*.

Similarly, the detailed design document 101*c* actually describes functions A-1, A-2, A 3, B 1, B-2, C-1, and C-2, but the vertical document comparing unit 134 extracts only the functions A-1, A-3, B-1, B-2, C-1, and C-2. The function A-2 is not extracted due to the performance limitations of the vertical document comparing unit 134, or the style of text, the wording used, or the description method of diagrams of the detailed design document 101*c*.

By comparing the extracted functions in such a situation, the vertical document comparing unit 134 determines that the function B corresponding to the functions B-1 and B-2 is not extracted. Thus, the vertical document comparing unit 134 adds omission information indicating the function B to the basic design document 101*b*.

However, the vertical document comparing unit 134 cannot detect the extraction omission of the function A-2. This is because the functions A-1 and A-3 corresponding to the function A are extracted. In other words, this is because although the function A-2 is not extracted, the corresponding functions (the functions A-1, A-2, and A-3) described in the detailed design document 101*c* cannot be inferred from the function A described in the basic design document 101*b*, that is, the content of the detailed function divisions for implementing the function A cannot be inferred. If all functions (here, the functions A-1, A-2, and A-3) corresponding to the function A are not extracted, an extraction omission can be detected.

The vertical document comparing unit 134 reads the information described in the development documents 101 to detect such an extraction omission.

As described above, a case in which an extraction omission cannot be detected is also presumed, but in such a case, the extraction omission may be avoided in the analysis results from the document analyzing unit 130 in combination with the results from the horizontal document comparing unit 133.

The cause of the omission may be an omission of the description in the basic design document 101*b* and the detailed design document 101*c* to be analyzed.

As described above, by performing a vertical comparison of the development documents 101, it is possible to supplement the performance limitations of the text analyzing unit 131 and the diagram analyzing unit 132. The effect is that accurate analysis can be performed even when there are failures such as omissions of description in the read development documents 101.

Figure 13:
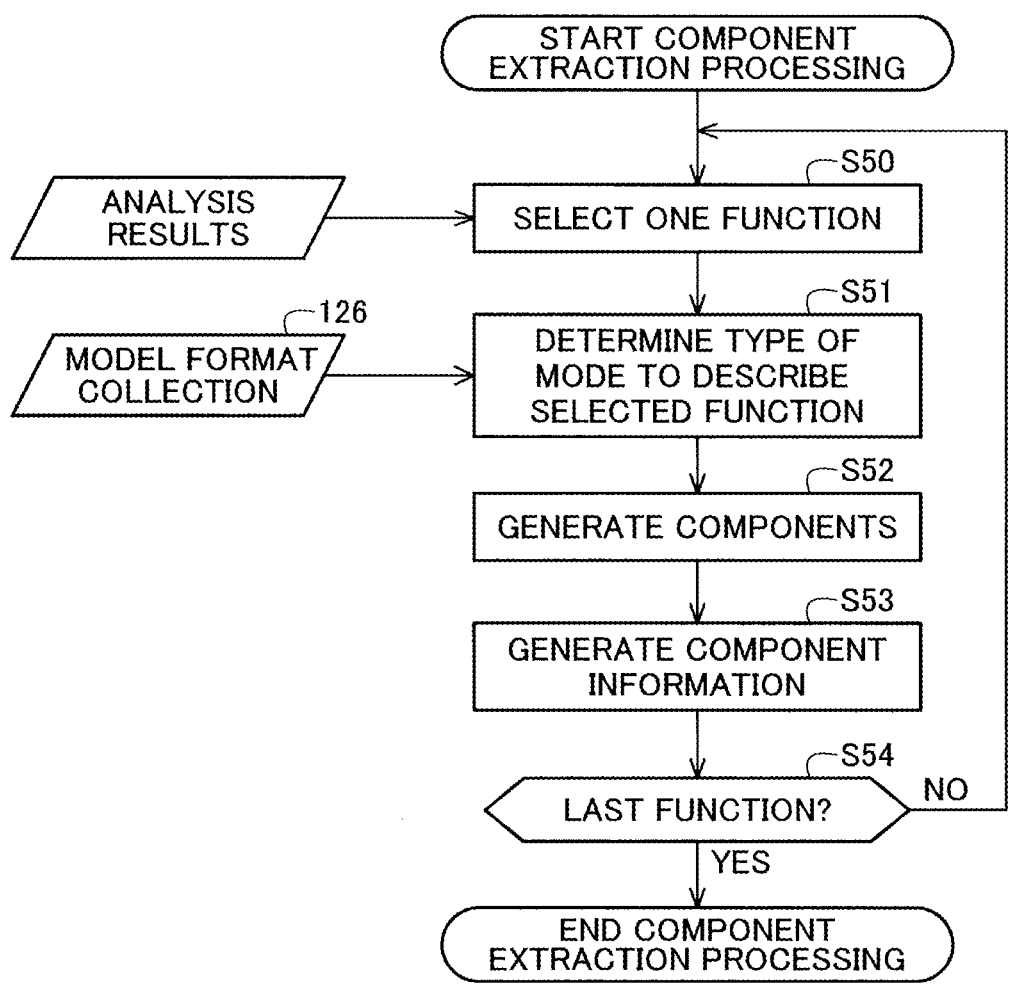
FIG. 13 is a flowchart illustrating processing by a component extracting unit.

FIG. 13 is a flowchart illustrating the processing by the component extracting unit 141.

The component extracting unit 141 performs the following processing for each of the development documents 101 by using at least one function included in the analysis results from the document analyzing unit 130.

The component extracting unit 141 selects one function included in the analysis results (step S50).

The component extracting unit 141 then refers to the model format collection 126 and determines the model in which the selected function should be described (step S51). For example, the classification of diagrams, which are the model, is preliminarily associated with the function, and the model is selected on the basis of the classification. Specifically, when a robot-controller communication function has been extracted from the detailed design document 101*c*, the communication function is associated with the classification "behavior," and a sequence diagram is determined as the model on the basis of the classification.

The component extracting unit 141 then generates the components to be described in the model on the basis of the function and the word group or constituent element group associated with the function (step S52). Since the components constituting the model are defined for each model, the component extracting unit 141 specifies the words or constituent elements corresponding to the definition as components. For example, for the robot-controller communication function, a figure representing a robot and a figure representing a controller are generated as components that can be the constituent elements (objects or classes) of a sequence diagram.

The component extracting unit 141 then generates component information associating the function, the generated components, and the type of the model, which is the description destination (step S53).

The component extracting unit 141 determines whether or not the last function in one development document 101 has already been selected (step S54). If the last function is not selected (No in step S54), the processing returns to step S50, and the next function is selected.

When one function is described in the diagrams, which are multiple models, the component extracting unit 141 repeats the above processing by the number of models of the description destination. Component information corresponding to each of the models is generated.

If a component portion in the diagram analysis results from the document analyzing unit 130 can be used for a model, e.g., if a diagram in a development document 101 is the same as the diagram as the model, the component portion can be used as a component. In such a case, for example, component information indicating the type of the model and the components constituting the model can be generated without going through the flowchart illustrated in FIG. 13.

Figure 14:
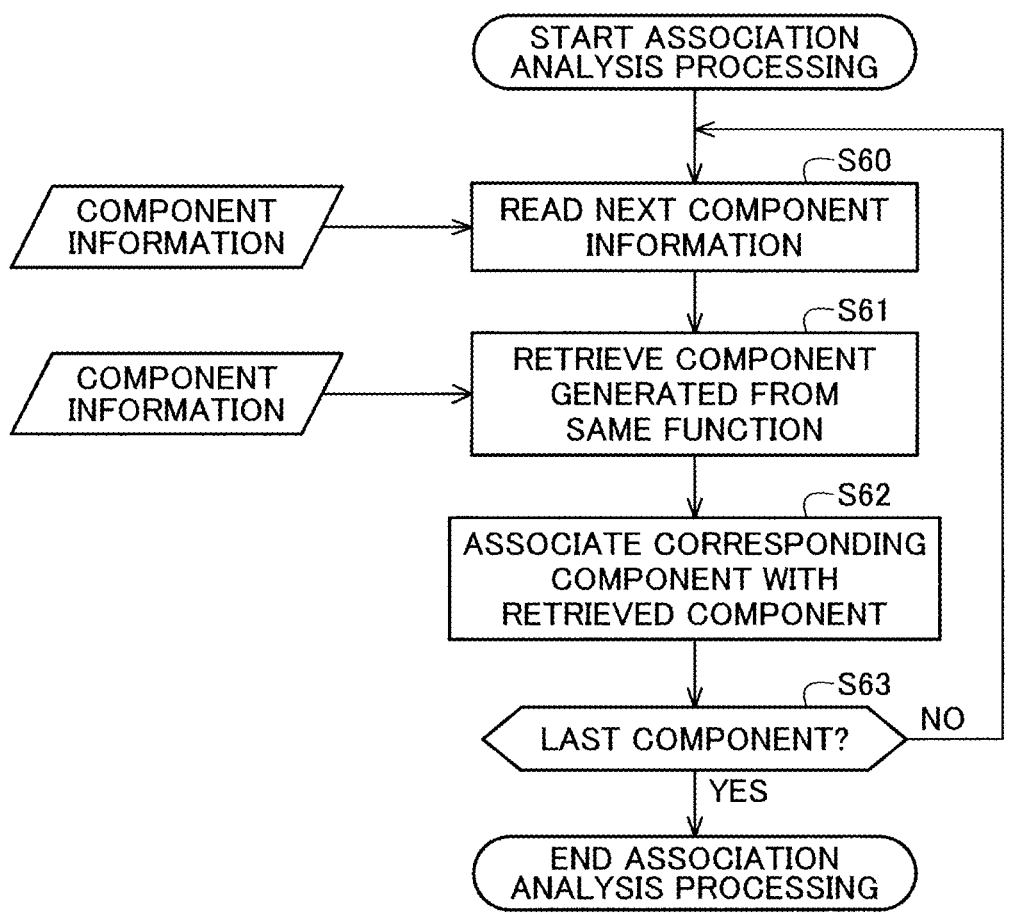
FIG. 14 is a flowchart illustrating processing by an association analyzing unit.

FIG. 14 is a flowchart illustrating the processing by the association analyzing unit 142.

The association analyzing unit 142 selects one piece of unselected component information from the multiple pieces of component information generated by the component extracting unit 141 (step S60).

The association analyzing unit 142 then retrieves a piece of component information indicating a component generated from the same function as that corresponding to the component indicated by the selected piece of component information (step S61).

The association analyzing unit 142 then generates association information that associates the pieces of component information retrieved in step S61 (step S62). The association analyzing unit 142 determines that the retrieved piece of component information has been selected.

The association analyzing unit 142 then determines whether or not all pieces of component information have been selected (step S63). If a piece of component information has not been selected (No in step S62), the processing returns to step S60.

Figure 15:
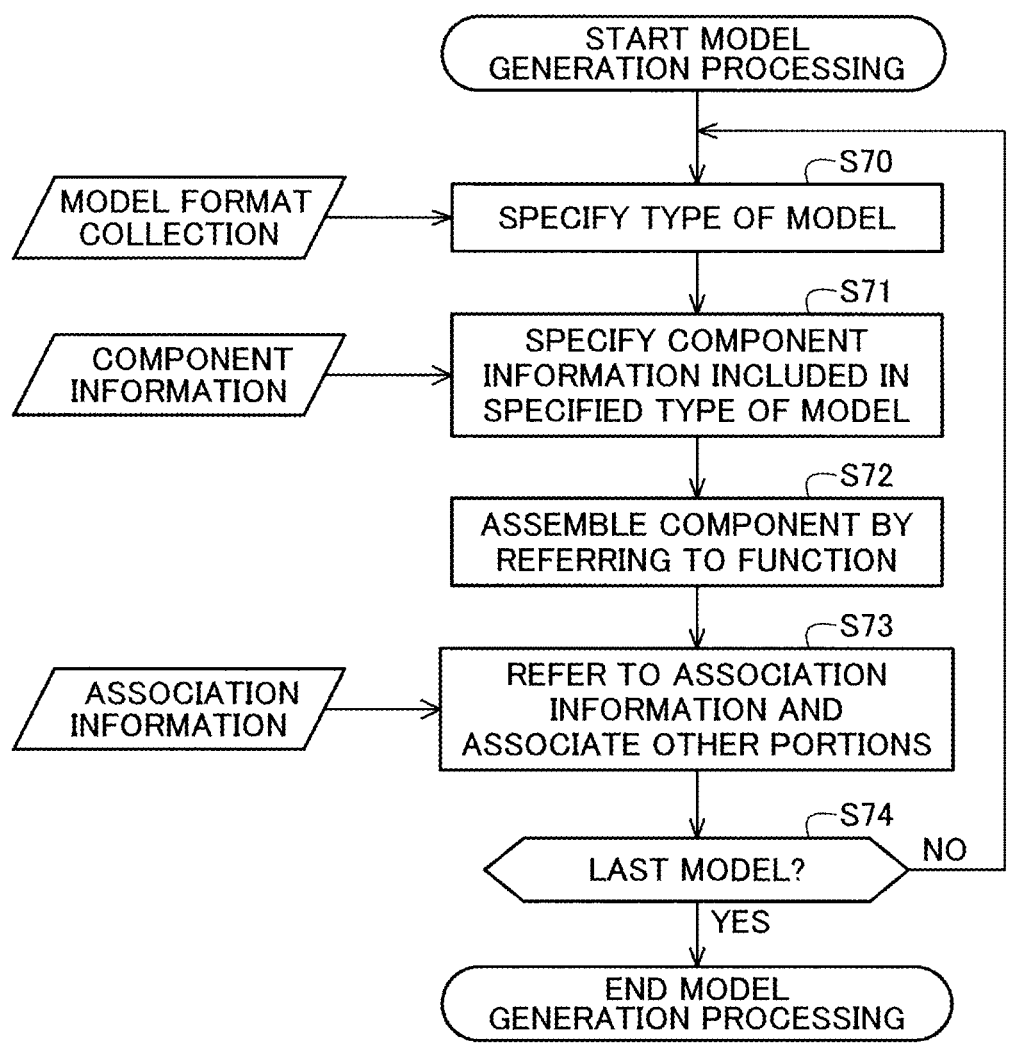
FIG. 15 is a flowchart illustrating processing by a model generating unit.

FIG. 15 is a flowchart illustrating the processing by the model generating unit 150.

The model generating unit 150 specifies the model to be generated by referring to the model format collection 126 (step S70).

The model generating unit 150 then specifies one piece of component information having the specified model as a description destination (step S71).

The model generating unit 150 then refers to the model format collection 126 to arrange the components indicated by the specified component information in accordance with the specified model (step S72). At this time, the model generating unit 150 refers to the configuration information indicating what information is included and what configuration is adopted for each model included in the model format collection 126.

The model generating unit 150 then refers to the association information to associate the component information associated with the same function as the specified component information and the type of another model with the component incorporated in step S72 (step S73).

The model generating unit 150 then determines whether or not the type of all models indicated in the model format collection 126 has been specified (step S74). If there is a type that has not been specified (No in step S74), the processing returns to step S70.

As described above, the effect is that, by preliminarily analyzing the components constituting a model by the component analyzing unit 140, the generation accuracy in the model generation processing in the subsequent stage can be improved.

Second Embodiment

The second embodiment will now be described by focusing on differences from the first embodiment. The same reference numerals are used for configurations that are the same or similar to that of the first embodiment, and the description thereof is omitted or simplified.

Figure 16:
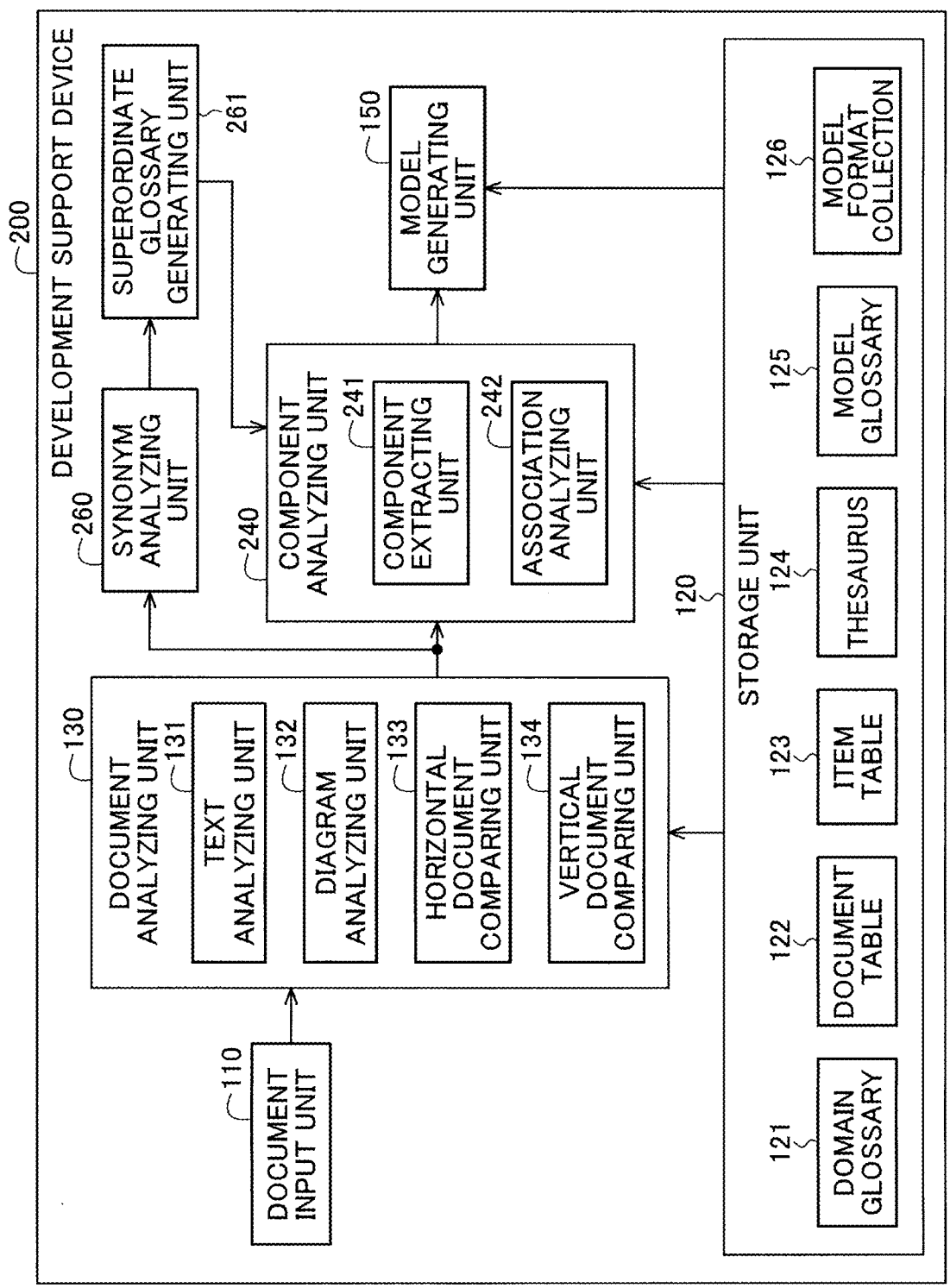
FIG. 16 is a block diagram schematically illustrating the configuration of a development support device according to a second embodiment.

FIG. 16 is a block diagram schematically illustrating the configuration of a development support device 200 according to the second embodiment.

The development support device 200 includes a document input unit 110, a storage unit 120, a document analyzing unit 130, a component analyzing unit 240, a model generating unit 150, a synonym analyzing unit 260, and a superordinate glossary generating unit 261.

The document input unit 110, the storage unit 120, the document analyzing unit 130, and the model generating unit 150 of the development support device 200 according to the second embodiment are respectively the same as the document input unit 110, the storage unit 120, the document analyzing unit 130, and the model generating unit 150 of the development support device 100 according to the first embodiment.

The synonym analyzing unit 260 specifies multiple word groups of words that are included in the described matters in the development documents 101 and have similar meanings, and a word representing each group on the basis of the analysis results from the document analyzing unit 130. Here, the word representing a group is also referred to as a representative word.

The superordinate glossary generating unit 261 generates a superordinate glossary including information indicating the relationship between the groups generated by the synonym analyzing unit 260, the locations where the words included in the groups appear in the development documents 101, and the words representing the groups.

The component analyzing unit 240 analyzes the components by using the superordinate glossary generated by the superordinate glossary generating unit 261 in addition to the analysis results from the document analyzing unit 130.

The component analyzing unit 240 includes a component extracting unit 241 and an association analyzing unit 242.

The component extracting unit 241 according to the second embodiment specifies the functions indicated by the document analysis results from the document analyzing unit 130. The component extracting unit 241 specifies a model corresponding to the specified functions. The component extracting unit 241 also generates the components of the specified model from at least one of the word group and the constituent element group corresponding to the specified functions. In the second embodiment, when a word in a word group belongs to a group indicated by the superordinate glossary, the component extracting unit 241 uses the superordinate glossary to replace the word with a word representing the group, to generate a component. In other words, the component extracting unit 241 uses the word representing a group in place of a similar word included in the group to generate a component.

Since the superordinate glossary specifies words representing groups of similar words, it serves to associate different words that indicate the same function. That is, a case where same components should be generated but different components are generated due to the use of different words can be avoided in the second embodiment because the same components can be generated from different words. Even if the same components are generated from multiple words, and even in a case where the name of the component extracted from multiple words cannot be uniquely determined, the component can be generated by using the representative word unifying them by referring to the superordinate glossary.

The component extracting unit 241 generates component information associating the functions, the generated components, and the model, which is the description destination. Here, the component extracting unit 241 may specify multiple models corresponding to the specified functions.

The association analyzing unit 242 according to the second embodiment performs the same processing as the association analyzing unit 142 according to the first embodiment, and also performs the following processing.

The association analyzing unit 242 specifies the association between the components indicated in the component information generated by the component extracting unit 241, and generates association information associating the pieces of component information. In the second embodiment, the association analyzing unit 242 also associates the pieces of component information of components generated from words included in a group having a predetermined relationship in the superordinate glossary generated by the superordinate glossary generating unit 261.

Figure 17:
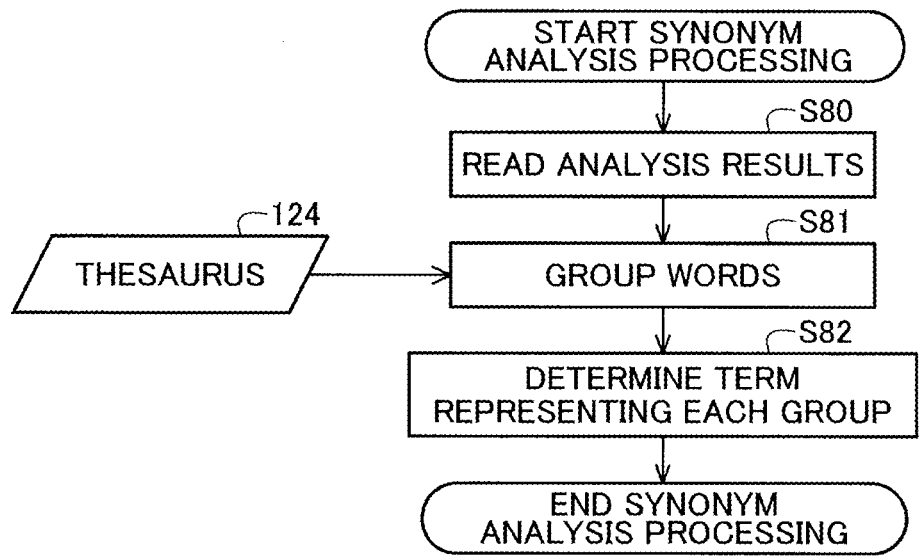
FIG. 17 is a flowchart illustrating processing by a synonym analyzing unit.

FIG. 17 is a flowchart illustrating the processing by the synonym analyzing unit 260.

The synonym analyzing unit 260 reads the analysis results from the document analyzing unit 130 and extracts words from the analysis results (step S80).

The synonym analyzing unit 260 then groups the words having similar meanings by referring to the thesaurus 124 (step S81).

Subsequently, the synonym analyzing unit 260 analyzes the words classified into groups and determines the words representing the groups (step S82). A word representing a group may be selected from the group or a new word not in the group may be generated. For example, the synonym analyzing unit 260 may specify a synonym representing the concept of each word in the group from the thesaurus 124, or may further classify the words in the group into subgroups and designate the word representing the subgroup in which the most words are classified as the representative word. Alternatively, the synonym analyzing unit 260 may specify the representative word by analyzing the tendency of the relationship between a representative word manually specified in the past and the words in the corresponding group.

The synonym analyzing unit 260 specifies multiple groups and multiple representative words through the above processing.

Figure 18:
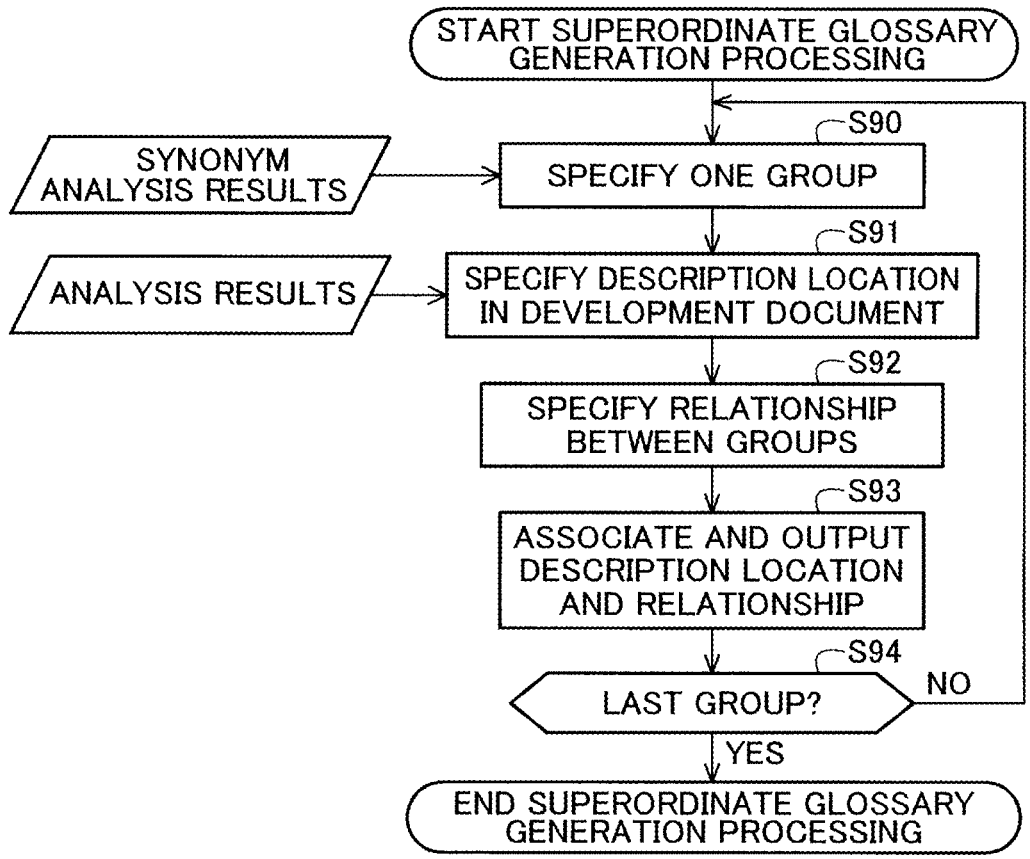
FIG. 18 is a flowchart illustrating processing by a superordinate glossary generating unit.

FIG. 18 is a flowchart illustrating the processing by the superordinate glossary generating unit 261.

The superordinate glossary generating unit 261 specifies a group in the multiple groups specified by the synonym analyzing unit 260 (step S90).

The superordinate glossary generating unit 261 then specifies in which development document 101 and where each of the words classified into each group appears by referring to the analysis results from the document analyzing unit 130, and arranges the specified information by group (step S91). Each word may appear in multiple development documents 101.

The superordinate glossary generating unit 261 then specifies the functions represented by the words of the groups on the basis of the analysis results from the document analyzing unit 130 by using the locations where the words appear as clues, and specifies the relationship between the groups from the predetermined relationships between the functions (step S92). For example, a function has a predetermined relationship with other functions, such as a superordinate function and a subordinate function, and such a predetermined function is specified as the relationship between groups.

The superordinate glossary generating unit 261 then generates a superordinate glossary containing information indicating the relationship between the groups generated by the synonym analyzing unit 260, the locations where the groups appear in the development documents 101, and the words representing the groups (step S93).

The superordinate glossary generating unit 261 then checks whether or not the above processing has been performed on all groups (step S94). If there is a group on which the processing has not yet been performed (No in step S94), the processing returns to step S90.

This achieves the effect that words having the same meaning or function dispersed through multiple development documents 101 can be grouped together, and component analysis and model generation at a subsequent stage can be facilitated. Another effect is that the fluctuation in the expression of terms is absorbed.

Third Embodiment

The third embodiment will now be described by focusing on differences from the second embodiment. The same reference numerals are used for configurations that are the same or similar to that of the second embodiment, and the description thereof is omitted or simplified.

Figure 19:
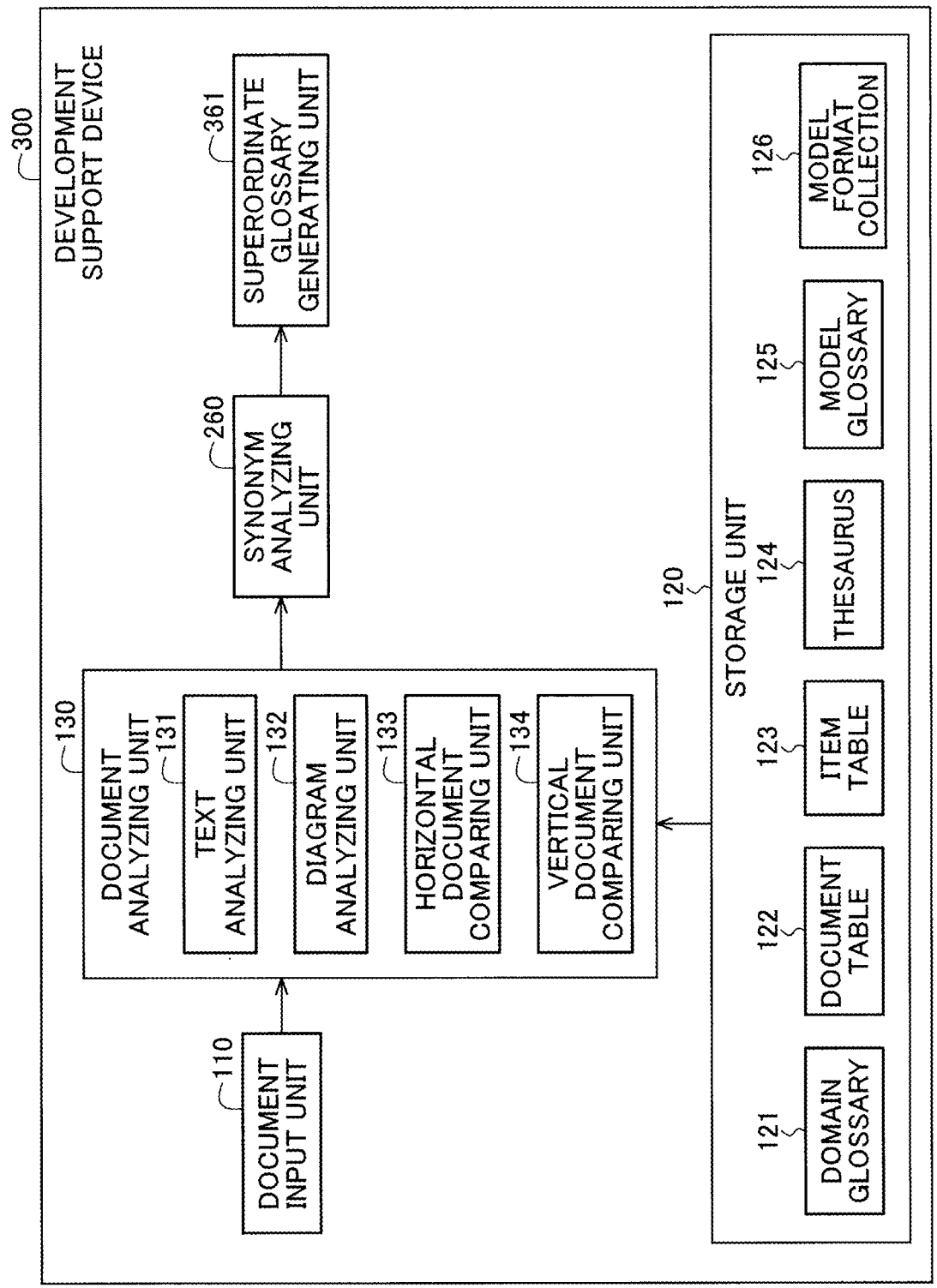
FIG. 19 is a block diagram schematically illustrating the configuration of a development support device according to a third embodiment.

FIG. 19 is a block diagram schematically illustrating the configuration of a development support device 300 according to the third embodiment.

The development support device 300 includes a document input unit 110, a storage unit 120, a document analyzing unit 130, a synonym analyzing unit 260, and a superordinate glossary generating unit 361.

The document input unit 110, the storage unit 120, and the document analyzing unit 130 of the development support device 300 according to the third embodiment are respectively the same as the document input unit 110, the storage unit 120, and the document analyzing unit 130 of the development support device 100 according to the first embodiment.

The synonym analyzing unit 260 of the development support device 300 according to the third embodiment is the same as the synonym analyzing unit 260 of the development support device 200 according to the second embodiment.

The superordinate glossary generating unit 361 generates a superordinate glossary as in the second embodiment.

The superordinate glossary generating unit 361 puts information indicating the superordinate glossary and the words included in the superordinate glossary as output information.

In the third embodiment, the user performs the processing performed by the component analyzing unit 140 and the model generating unit 150 in the first and second embodiments. That is, the user creates a model by using the output information generated by the superordinate glossary generating unit 361.

This achieves the effect that the development support device 300 can be driven even when the development documents 101 are in an incomplete state, for example, a developing or partially lost state, and a model can be generated by supplementing a request or specification not described in the development documents 101 by a user operation in a subsequent stage.

Fourth Embodiment

The fourth embodiment will now be described by focusing on differences from the first embodiment. The same reference numerals are used for configurations that are the same or similar to that of the first embodiment, and the description thereof is omitted or simplified.

Figure 20:
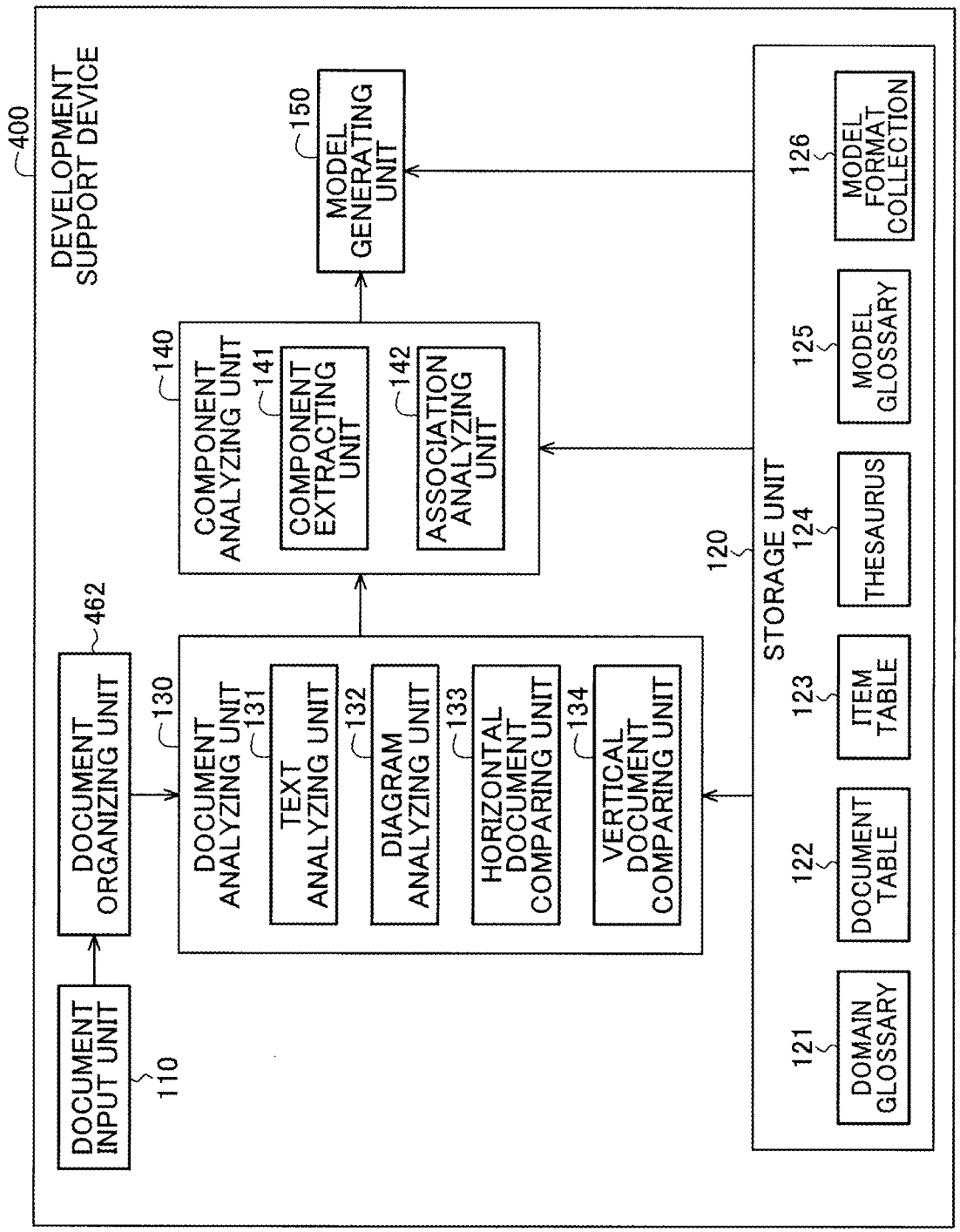
FIG. 20 is a block diagram schematically illustrating the configuration of a development support device according to a fourth embodiment.

FIG. 20 is a block diagram schematically illustrating the configuration of a development support device 400 according to the fourth embodiment.

The development support device 400 includes a document input unit 110, a storage unit 120, a document analyzing unit 130, a component analyzing unit 140, a model generating unit 150, and a document organizing unit 462.

The document input unit 110, the storage unit 120, the document analyzing unit 130, the component analyzing unit 140, and the model generating unit 150 of the development support device 400 according to the fourth embodiment are respectively the same as the document input unit 110, the storage unit 120, the document analyzing unit 130, the document analyzing unit 140, and the model generating unit 150 of the development support device 100 according to the first embodiment.

The document organizing unit 462 is a document selecting unit that receives input of multiple development documents 101 from the document input unit 110, selects only appropriate development documents 101 from the multiple development documents 101, and stores them in the storage unit 120. This is based on the presumption that the multiple development documents 101 include development documents 101 that are unnecessary for the generation of a model. In other words, the document organizing unit 462 selects the development documents 101 to be analyzed by the document analyzing unit 130 from the multiple development documents 101.

For example, when a model is generated from the development documents 101 of a first product, development documents 101 of a related second product may also be input to the development support device 400. In such a case, the document organizing unit 462 removes the development documents 101 of the second product.

In the sorting of the development documents 101 by the document organizing unit 462, the development documents 101 not described in the document table 122 can be removed by referring to the document table 122. Alternatively, the document organizing unit 462 may sort the documents by analyzing the association between the documents without using the document table 122. For example, it can be determined through vertical comparison that functions A-1 and A-2 can be grouped together into a function A of a superordinate development document 101. Thus, development documents 101 that do not have a vertical association can be removed. Even if multiple groups of the development documents 101 having a vertical association are detected, the development documents 101 in groups of a small number of documents can be removed. Moreover, even if multiple groups of the development documents 101 having a vertical association are detected, the development documents 101 in groups without a most superordinate development document 101 can be removed.

When sorting is performed by using a function, the document organizing unit 462 may use the document analyzing unit 130 to feed back the analysis results to sort the documents again, and the document analyzing unit 130 may perform the processing again on the basis of the results.

Accordingly, the effect is that by sorting the development documents 101 in advance, it is possible to generate models without limiting the input development documents 101 to specific ones.

Fifth Embodiment

The fifth embodiment will now be described by focusing on differences from the first embodiment. The same reference numerals are used for configurations that are the same or similar to that of the first embodiment, and the description thereof is omitted or simplified.

Figure 21:
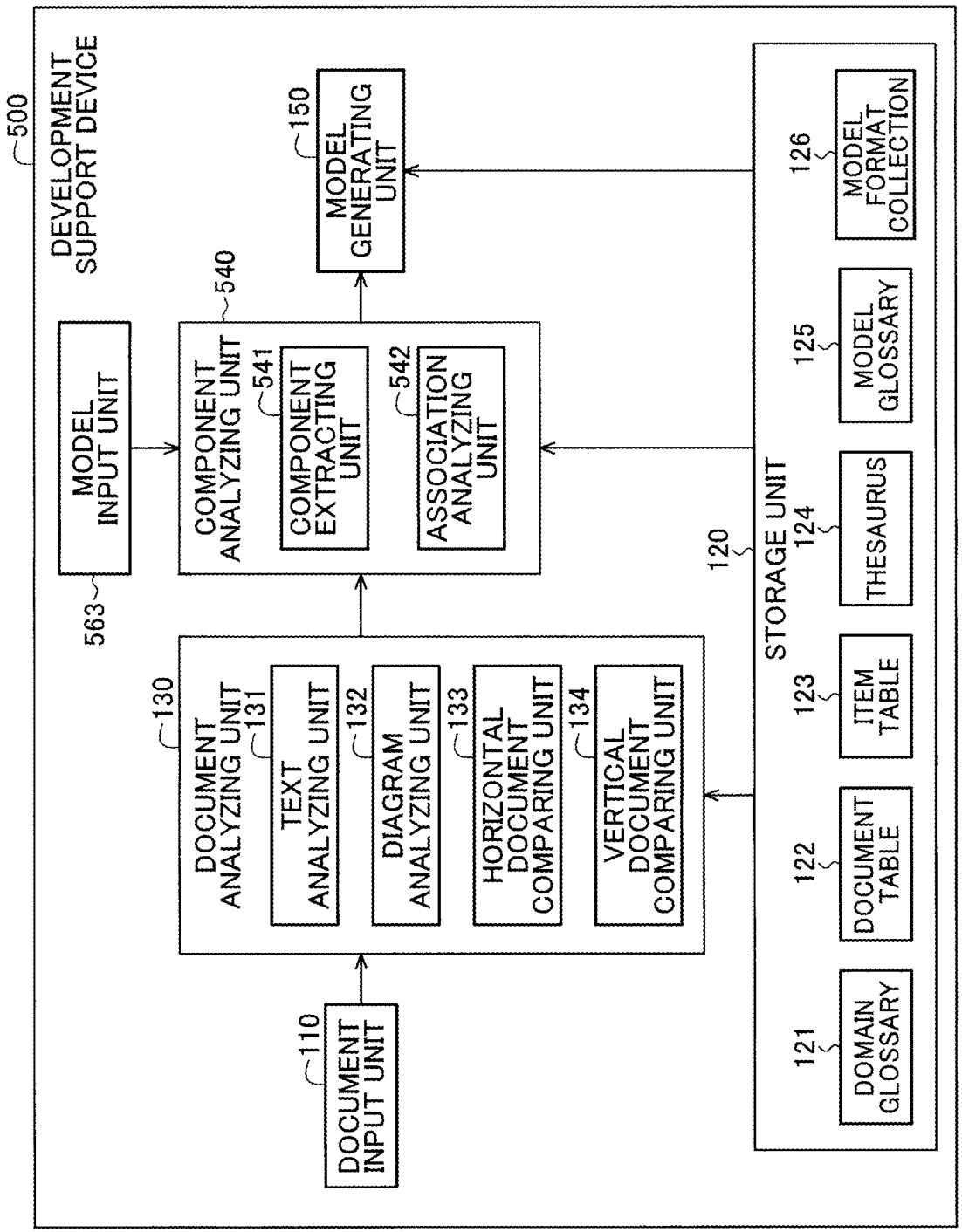
FIG. 21 is a block diagram schematically illustrating the configuration of a development support device according to a fifth embodiment.

FIG. 21 is a block diagram schematically illustrating the configuration of a development support device 500 according to the fifth embodiment.

The development support device 500 includes a document input unit 110, a storage unit 120, a document analyzing unit 130, a component analyzing unit 540, a model generating unit 150, and a model input unit 563.

The document input unit 110, the storage unit 120, the document analyzing unit 130, and the model generating unit 150 of the development support device 500 according to the fifth embodiment are respectively the same as the document input unit 110, the storage unit 120, the document analyzing unit 130, and the model generating unit 150 of the development support device 100 according to the first embodiment.

The model input unit 563 receives input of a model, breaks down the model into components, and gives the components to the component analyzing unit 540 in association with the functions related to the components. This is for deal with the case in which the input to the development support device 500 is not limited to the development documents 101, and some of the development documents 101 have already been created as models. The models input to the model input unit 563 are also referred to as input models, the components constituting the input models are also referred to as input components, and the functions corresponding to the input components are also referred to as input functions.

Although there are cases in which the input models can be directly included in the model being generated by the development support device 500, it is presumed that there are cases in which the input models are incomplete, or cases in which the component analyzing unit 540 analyzes the association between the components constituting the input models and the components included in a new model or another model generated by the model generating unit 150 by analyzing development documents 101; thus, the input models are once broken down into components and input to the component analyzing unit 540.

When the functions specified in the development documents 101 match the input functions, the component analyzing unit 140 uses the input components as at least some of the components constituting the models.

Since the models input from the model input unit 563 are completed models, they can be used "as is." For example, when architecture diagrams are input separately from the development documents 101, the architecture diagrams can be used "as is," and other diagrams can be generated by the model generating unit 150. However, when there is an error in at least one of the input models and the development documents 101, or when there is an error in the analysis of the development documents 101, the input models and the development documents 101 do not coincide, and thus the error can be corrected by matching the model generated by using the development documents 101 with the input models. In such a case, the input models are once broken down into components and input to the component analyzing unit 540.

For example, in some cases, the same components are incorporated into multiple models, such as in a case where a portion indicating the character string "robot" appears in both a use case diagram and a sequence diagram. In such a case, if the sequence diagram is input from the model input unit 563, the components broken down from the sequence diagram can be used in the generation of the use case diagram.

The development support device 500 may include a model selecting unit (not illustrated) that acquires models from the model input unit 563. The model selecting unit compares a model acquired from the model input unit 563 with a model generated by the model generating unit 150 and selects one of them as the model to be output.

The component analyzing unit 540 receives the document analysis results from the document analyzing unit 130 to generate the components constituting a model, and generates component information indicating the generated components and their description destination and association information between the pieces of component information.

The component analyzing unit 540 receives the document analysis results from the document analyzing unit 130 to generate the components constituting a model, and generates component information indicating the generated components and their description destination and association information between the pieces of component information.

The component analyzing unit 540 includes a component extracting unit 541 and an association analyzing unit 542.

The component extracting unit 541 generates components corresponding to the functions based on the functions indicated by the document analysis results from the document analyzing unit 130, or selects the components input from the model input unit 563, to specify the components and the model describing the components. The component extracting unit 541 generates component information associating the functions, the generated components, and the model, which is the description destination. When the components corresponding to the functions are input from the model input unit 563, the component extracting unit 541 may use these components instead of generating components.

For example, the component extracting unit 541 can use the input components as components of the model when the specified functions match the input functions.

An association analyzing unit 542 specifies the association between the components indicated by the component information generated by the component extracting unit 541 and generates association information that associates the pieces of component information.

In this way, a case in which input to the development support device 500 is not only limited to the development documents 101, but also includes some models can be delt with; this achieves the effect of more accurate component analysis.

Sixth Embodiment

The sixth embodiment will now be described by focusing on differences from the first embodiment. The same reference numerals are used for configurations that are the same or similar to that of the first embodiment, and the description thereof is omitted or simplified.

Figure 22:
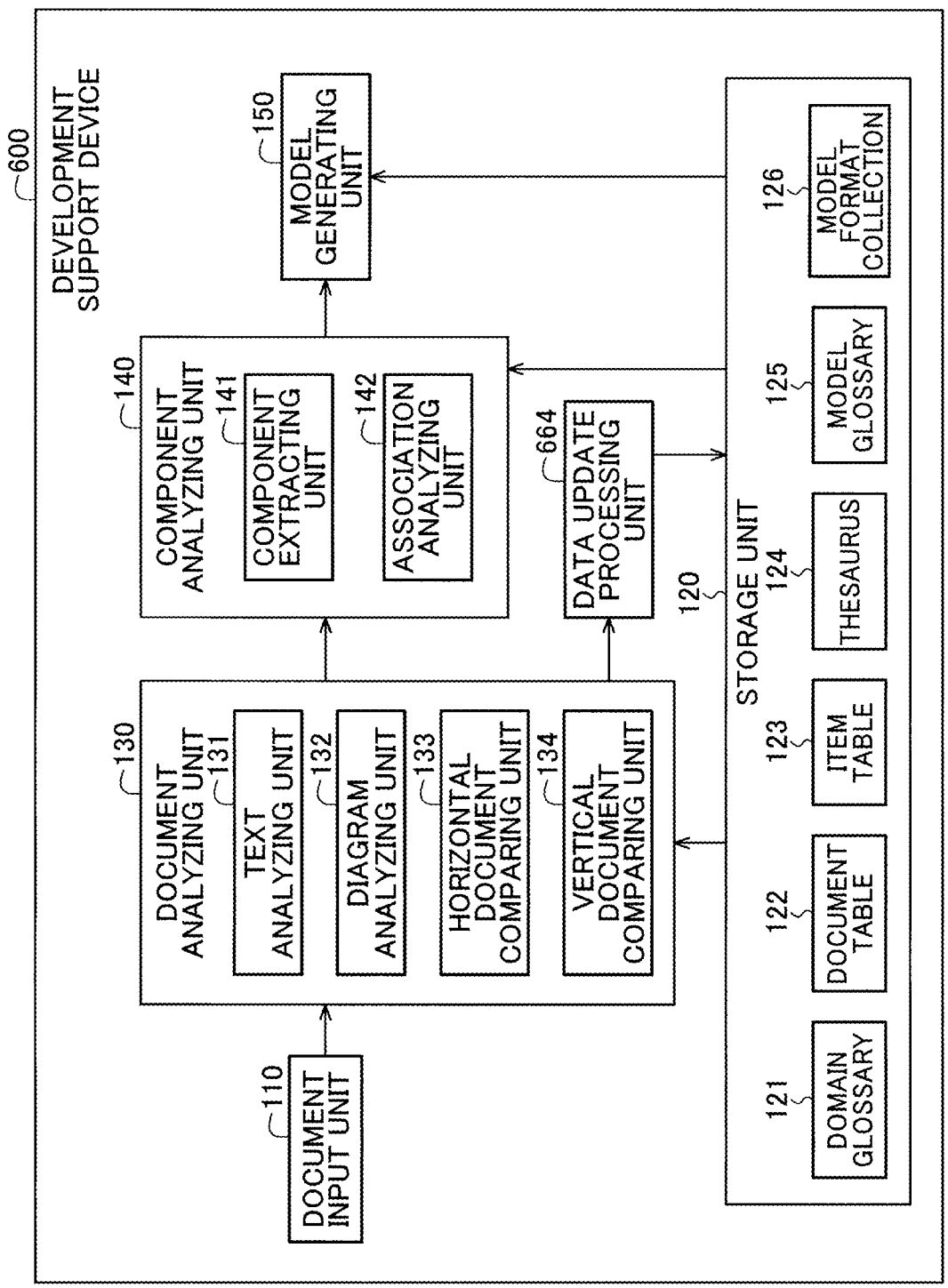
FIG. 22 is a block diagram schematically illustrating the configuration of a development support device according to a sixth embodiment.

FIG. 22 is a block diagram schematically illustrating the configuration of a development support device 600 according to the sixth embodiment.

The development support device 600 includes a document input unit 110, a storage unit 120, a document analyzing unit 130, a component analyzing unit 140, a model generating unit 150, and a data update processing unit 664.

The document input unit 110, the storage unit 120, the document analyzing unit 130, the component analyzing unit 140, and the model generating unit 150 of the development support device 600 according to the sixth embodiment are respectively the same as the document input unit 110, the storage unit 120, the document analyzing unit 130, the document analyzing unit 140, and the model generating unit 150 of the development support device 100 according to the first embodiment.

The data update processing unit 664 updates the data stored in the storage unit 120 on the basis of the analysis results output by the document analyzing unit 130. For example, the document analyzing unit 130 analyzes a development document 101 on the basis of an item table 123, but if the content of the analysis results does not match the item table 123, the data update processing unit 664 overwrites the item table 123 to minimize the difference. Specifically, when a section not listed in the item table 123 is detected in the analysis results from the document analyzing unit 130, the data update processing unit 664 adds the section to the item table 123. When a section described in the item table 123 is not found in the development document 101, the data update processing unit 664 deletes the section from the item table 123.

The data update processing unit 664 may update the thesaurus 124 when apparently similar words are found in the analysis results from the document analyzing unit 130, such as different words that represent the same function.

The development support device 600 can drive the document analyzing unit 130 to repeatedly analyze the development documents 101 in response to the data update processing unit 664 overwriting the storage unit 120. The analysis may be repeated any number times, e.g., one time or more.

In this way, the effect is that the data update processing unit 664 updating the storage unit 120 enables the documents to be analyzed with high accuracy without being affected by the omission of information or errors in the information contained in the storage unit 120.

The first to sixth embodiments can be modified in various ways without departing from their broad spirit and scope.

DESCRIPTION OF REFERENCE CHARACTERS

100, 200, 300, 400, 500, 600 development support device; 110 document input unit; 120 storage unit; 130 document analyzing unit; 131 text analyzing unit; 132 diagram analyzing unit; 133 horizontal document comparing unit; 134 vertical document comparing unit; 140, 240, 540 component analyzing unit; 141, 241, 541 component extracting unit; 142, 242, 542 association analyzing unit; 150 model generating unit; 260 synonym analyzing unit; 261, 361 superordinate glossary generating unit; 462 document organizing unit; 563 model input unit; 664 data update processing unit.

What is claimed is:

1. A development support device comprising:
   circuitry to execute a program; and
   a memory to store the program which, when executed by the circuitry, performs processes of:
   analyzing a described matter in a development document created in a development process, and specifying a function described in the development document;
   specifying a model corresponding to the specified function, and generating a plurality of components conforming to a standardized format with respect to the specified model by using an analysis result of the described matter;
   incorporating a component selected from the plurality of components in accordance with the format to generate the specified model; and
   specifying an input component and an input function in an input model different from the specified model, the input component being a component constituting the input model, the input function being a function corresponding to the input component,
   wherein:
   the input component is used as at least a part of the plurality of components of the specified model when the specified function matches the input function, and
   the analyzing includes comparing the described matter in the development document with a document table stored in the memory to determine an association of the development document with an existing product development process,
   wherein the comparing the described matter in the development document with the document table includes extracting text portions and diagram portions of the development document to extract the function described in the development document, and
   wherein:
   the document table stores data of a plurality of known development documents, the document table includes an identification number column, a document name column, a preceding document column, a following document column, and a relative document column, and the relative document column stores a document number of one or more of the plurality of known development documents having a horizontal association with the development document.

2. The development support device according to claim 1, wherein:

the circuitry specifies the function by analyzing a text portion included in the development document as the described matter; and the circuitry specifies the function by analyzing a diagram portion included in the development document as the described matter.

3. The development support device according to claim 1, wherein:

the circuitry specifies a plurality of word groups of words included in the described matter and having similar meanings, and specifies representative words representing the groups, based on the analysis result, the circuitry uses the representative words in place of the plurality of words when the plurality of components is generated.

4. The development support device according to claim 1, the circuitry refers to an item table indicating items of the development document to analyze the described matter.

5. The development support device according to claim 1, wherein:

the circuitry specifies two or more components corresponding to the specified function in the plurality of components as components having an association, and generates association information indicating the two or more components, and the circuitry refers to the association information and incorporates the two or more components to generate the specified model.

6. The development support device according to claim 1, wherein the circuitry selects the development document to be analyzed from a plurality of development documents.

7. The development support device according to claim 4, wherein the processor updates the item table in accordance with an analysis result by the circuitry.

8. The development support device according to claim 3, wherein the circuitry generates a superordinate glossary including information indicating a relationship between the groups and locations where the words included in the groups appear in the development document.

9. A non-transitory computer-readable medium that stores therein a program that causes a computer to execute processes of:

analyzing a described matter in a development document created in a development process, and specifying a function described in the development document;

specifying a model corresponding to the specified function, and generating a plurality of components conforming to a standardized format with respect to the specified model by using an analysis result of the described matter;

incorporating a component selected from the plurality of components in accordance with the format to generate the specified model; and specifying an input component and an input function in an input model different from the specified model, the input component being a component constituting the input model, the input function being a function corresponding to the input component, wherein the input component is used as at least a part of the plurality of components of the specified model when the specified function matches the input function, wherein the analyzing includes comparing the described matter in the development document with a document table stored in the memory to determine an association of the development document with an existing product development process and extracting text portions and diagram portions of the development document to extract functions described in the development document, and wherein:

the document table stores data of a plurality of known development documents, the document table includes an identification number column, a document name column, a preceding document column, a following document column, and a relative document column, and the relative document column stores a document number of one or more of the plurality of known development documents having a horizontal association with the development document.

10. A development support method comprising:

analyzing a described matter in a development document created in a development process, and specifying a function described in the development document;

specifying a model corresponding to the specified function;

generating a plurality of components conforming to a standardized format with respect to the specified model by using an analysis result of the described matter;

incorporating a component selected from the plurality of components in accordance with the format to generate the specified model; and specifying an input component and an input function in an input model different from the specified model, the input component being a component constituting the input model, the input function being a function corresponding to the input component, wherein the input component is used as at least a part of the plurality of components of the specified model when the specified function matches the input function, wherein the analyzing includes comparing the described matter in the development document with a document table stored in the memory to determine an association of the development document with an existing product development process and extracting text portions and diagram portions of the development document to extract functions described in the development document, and wherein:

the document table stores data of a plurality of known development documents, the document table includes an identification number column, a document name column, a preceding document column, a following document column, and a relative document column, and the relative document column stores a document number of one or more of the plurality of known development documents having a horizontal association with the development document.

11. The development support device according to claim 1, wherein the analyzing further includes analyzing the extracted diagram portions by referring to a model format collection stored in memory, specifying a relationship between constituent elements in a constituent elements group, which is a subgroup included in the diagram portion, as a diagram relationship, and, on the basis of the specified diagram relationship, generating a diagram analysis results indicating the specified constituent element group, the diagram relationship, and the function specified from the constituent element group.

12. The non-transitory computer-readable medium according to claim 9, wherein the comparing the described matter in the development document with the document table includes extracting text portions and diagram portions of the development document to extract the function described in the development document.

13. The non-transitory computer-readable medium according to claim 9, wherein the analyzing further includes analyzing the extracted diagram portions by referring to a model format collection stored in memory, specifying a relationship between constituent elements in a constituent elements group, which is a subgroup included in the diagram portion, as a diagram relationship, and, on the basis of the specified diagram relationship, generating a diagram analysis results indicating the specified constituent element group, the diagram relationship, and the function specified from the constituent element group.

14. The development support method according to claim 10, wherein the comparing the described matter in the development document with the document table includes extracting text portions and diagram portions of the development document to extract the function described in the development document.

15. The development support method according to claim 10, wherein the analyzing further includes analyzing the extracted diagram portions by referring to a model format collection stored in memory, specifying a relationship between constituent elements in a constituent elements group, which is a subgroup included in the diagram portion, as a diagram relationship, and, on the basis of the specified diagram relationship, generating a diagram analysis results indicating the specified constituent element group, the diagram relationship, and the function specified from the constituent element group.

* * * * *